(12) United States Patent
Kanan

(10) Patent No.: US 11,923,682 B1
(45) Date of Patent: Mar. 5, 2024

(54) SYSTEMS AND METHODS FOR TRANSFERRING A BEHIND-THE-METER LOAD BETWEEN RENEWABLE ENERGY POWER PLANTS

(71) Applicant: 8ME NOVA, LLC, El Dorado Hills, CA (US)

(72) Inventor: Nadim Kanan, Irving, TX (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/467,988

(22) Filed: Sep. 15, 2023

(51) Int. Cl.
*H02J 3/00* (2006.01)
*H02J 3/32* (2006.01)
*H02J 3/38* (2006.01)

(52) U.S. Cl.
CPC .............. *H02J 3/0075* (2020.01); *H02J 3/32* (2013.01); *H02J 3/381* (2013.01); *H02J 2203/10* (2020.01); *H02J 2300/20* (2020.01)

(58) Field of Classification Search
CPC .. H02J 3/0075; H02J 3/32; H02J 3/381; H02J 2203/10; H02J 2300/20
USPC .......................................................... 307/43
See application file for complete search history.

(56) References Cited

U.S. PATENT DOCUMENTS 11,782,399 B1 * 10/2023 Buttgenbach ......... H02J 7/0048
700/287

* cited by examiner

*Primary Examiner* — Hal Kaplan
(74) *Attorney, Agent, or Firm* — Foley & Lardner LLP

(57) ABSTRACT

The present disclosure describes a system that includes a behind-the-meter load, a switching system, and a controller. The controller can be configured to receive, from the REPP controller of each of the plurality of REPPs, energy data regarding available energy of the REPP; determine first energy data received from a first REPP controller of a first REPP of the plurality of REPPs satisfies a condition; and responsive to the determination, adjust a switching position of the switching system to a first switching position to enable the first REPP to provide energy to the behind-the-meter load.

20 Claims, 7 Drawing Sheets

SYSTEMS AND METHODS FOR TRANSFERRING A BEHIND-THE-METER LOAD BETWEEN RENEWABLE ENERGY POWER PLANTS

BACKGROUND

Several industrial applications may implement the use of an energy storage system ("ESS") for the use of storing, and later providing, electrical energy. An ESS may include one or more transformers that enable the ESS to distribute large amounts of energy across transmission lines. The ESS may be stored inside a renewable energy facility, in some cases with other renewable energy sources (RESs). For instance, the ESS and/or the RESs may be configured to power or energize equipment operating within the renewable energy facility to ensure the renewable energy facility remains operational. The ESS and/or the RESs can additionally be used to provide energy to an energy grid to distribute the energy to other loads connected to the energy grid.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

Figure 1A:
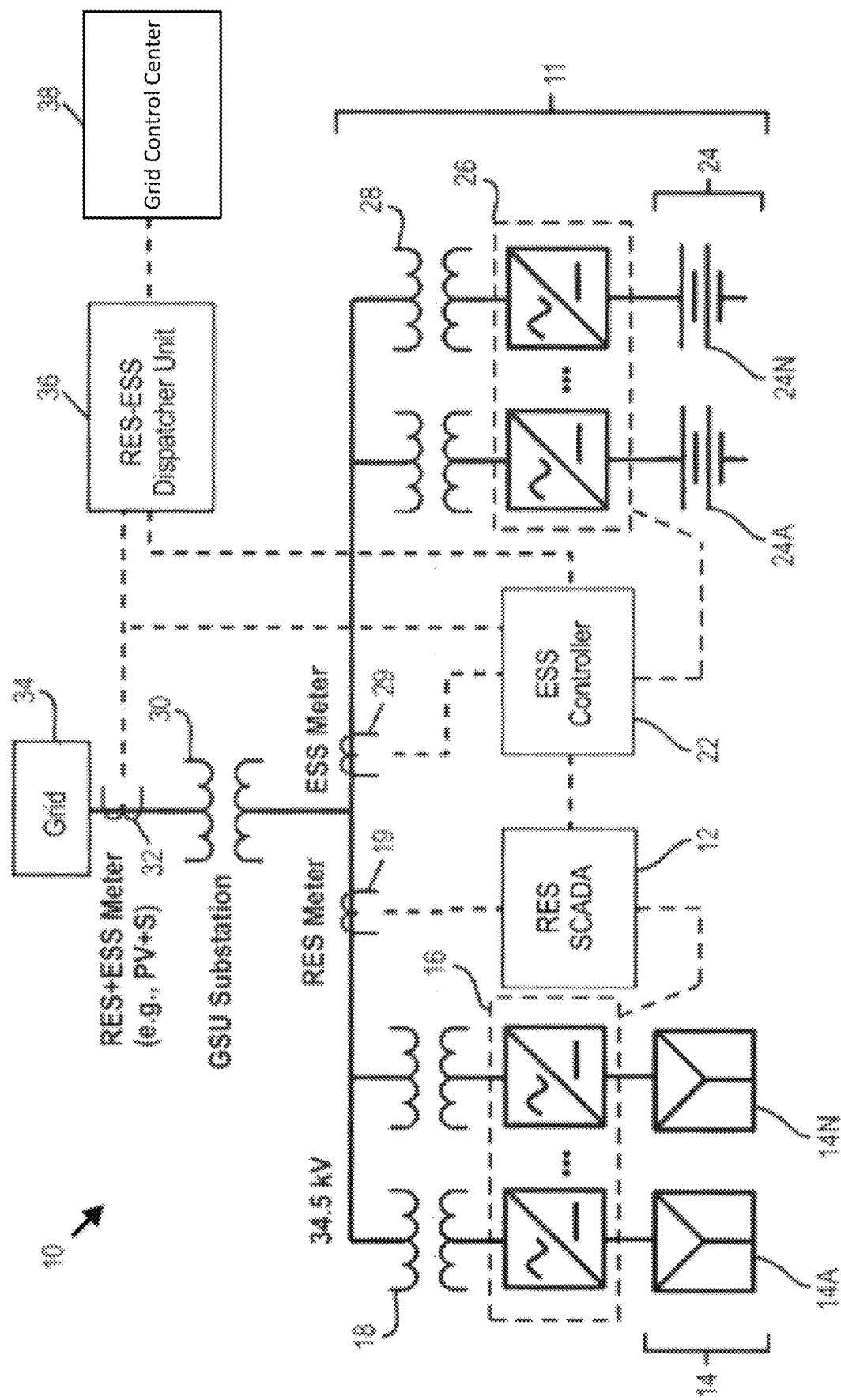
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Renewable energy power plants may generate and store energy over time. In some cases, renewable energy power plants may generate more energy than the system can propagate to an energy grid and/or store in an energy storage system of the renewable energy power plant. This may occur, for example, when renewable energy power plants are limited by the size of the energy storage system or an energy capacity at the point-of-grid interconnect between the renewable energy power plant and the energy grid. An operator of the renewable energy power plant may seek to avoid these issues by obtaining larger equipment or equipment that is configured to store more energy and/or handle higher quantities of energy. In some cases, the operator may configure the renewable energy power plant to curtail generated energy to avoid damaging existing components within the renewable energy power plant. Each of these solutions may result in wasted energy and/or high costs in space and equipment.

A processor implementing the systems and methods discussed herein may overcome the aforementioned technical deficiencies by using a transferrable behind-the-meter load. The transferrable behind-the-meter load can be or include any type of load that can receive and operate with received power. The transferrable behind-the-meter load can be selectively coupled with the different renewable energy power plants through a switching system. The processor can control the switches within the switching system such that the transferrable behind-the-meter load can be charged with energy by different renewable energy power plants over different time periods. The processor can control the switching system to connect the transferrable behind-the-meter load to different renewable energy power plants that have energy that is available to use to power the behind-the-meter load. Available energy may be energy that is available after meeting any energy supplier requirements the renewable energy power plants have with other systems (e.g., the energy grid or other offtakers) and/or have powered the devices within the renewable energy power plants themselves. Such available energy can be energy that would have otherwise been curtailed and/or energy that is stored in an energy storage system that is not needed to satisfy any commitment requirements, for example. The processor can connect the behind-the-meter load with the renewable energy power plants that have available energy over time such that the behind-the-meter load is powered with the available energy. Accordingly, the processor can control the switches to enable the transferrable behind-the-meter load to operate using available energy that would have otherwise been dissipated or curtailed by the respective renewable energy power plants, thus reducing waste of renewable energy across renewable energy power plants.

In some cases (e.g., due to various state and/or federal regulations applicable to generation and wholesale sale of electricity and the operation of investor-owned utilities, or for contractual reasons), energy cannot be intermingled between or among different power plants to concurrently power the same behind-the-meter load. To satisfy such constraints, the processor can be configured to ensure the switching configuration of the switching system only connects the behind-the-meter load with a single renewable energy power plant at a time. The processor can adjust the switching configuration of the switching system over time, but each adjustment can cause only one renewable energy power plant to connect with the behind-the-meter load at a time.

In some embodiments, the processor can select which renewable energy power plants to connect with the behind-the-meter load. The processor may do so, for example, by calculating a score for each renewable energy power plant that is configured to be coupled with the behind-the-meter load through the switching system. The score can be a function of a value (e.g., the cost, which may be an opportunity cost, of using energy to power a behind-the-meter load) of the energy. For example, the processor can determine higher scores for renewable energy power plants with available energy and lower values of energy. In some cases, the processor may only calculate such scores for renewable energy power plants that have enough available energy to satisfy a minimum energy requirement of the behind-the-meter load. The processor can calculate scores for individual renewable energy power plants over time and select and connect the behind-the-meter load with the highest scoring renewable energy power plants. In doing so, the processor can ensure that multiple renewable energy power plants do not power the behind-the-meter load at once and ensure the behind-the-meter load is sufficiently powered by the renewable energy power plant best-positioned to provide the power.

Behind-the-Meter Load Transfer System

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES-ESS facility 11 is shown, according to one embodiment. N can be any number. The N of the multiple generation units 14A-14N can be the same as or different from the N of the multiple energy storage units 24A-24N. The RES-ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES-ESS facility 11 that uses power conversion systems (PCSs) 16, 26 to convert DC power produced by a renewable electrical energy generation device 14 (e.g., a PV array in certain embodiments) or power released by the energy storage device 24 to AC power for coupling to an AC electrical grid 34. The PCSs 16, 26 can be devices that can change the voltage. The PCSs 16, 26 can be used as switches and power flow control devices. Examples of PCSs 16, 26 can include inverters, AC-to-AC converters, DC-to-DC converters, etc. In certain embodiments, the RES-ESS facility 11 may embody a DC coupled RES-ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one electrolysis unit (e.g., configured to electrolyze water to release hydrogen) and a hydrogen storage unit (e.g., adsorbent media for releasably binding hydrogen, hydrogen storage vessels, and/or reversible chemical reactant vessels or beds). In certain embodiments, an energy storage device 24 may include electrical charge storage devices such as batteries, optionally augmented with capacitors.

In certain embodiments, a RES-ESS dispatcher unit 36 has the ability to control the charge or discharge of the energy storage device 24 (e.g., batteries) by communicating with an ESS controller 22. The ESS controller 22 may be located in the RES-ESS facility 11. A RES SCADA (supervisory control and data acquisition) controller 12 may be operatively coupled with RES PCSs 16 associated with the renewable electrical energy generation device 14 (optionally embodied in a PV array), and the ESS controller 22 may be operatively coupled with ESS PCSs 26 associated with the energy storage device 24. Both the RES SCADA controller 12 and the ESS controller 22 may be in communication with the RES-ESS dispatcher unit 36. In certain embodiments, a utility control center 38 (e.g., of an electric power utility or grid operator) may communicate with the RES-ESS dispatcher unit 36 using DNP3 and set different configuration options. Additionally, the RES-ESS dispatcher unit 36 may receive or generate an accurate renewable generation forecast (e.g., solar generation forecast).

As shown in FIG. 1A, certain embodiments may utilize readily available electric power meters, such as a RES+ESS electrical power meter 32 to measure RES-ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES-ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the PCSs 16, 26, respectively, and the GSU substation 30 to provide voltage conversion utility (e.g., to supply AC power signals to the GSU substation 30 at 34.5 kV in certain implementations).

Figure 1B:
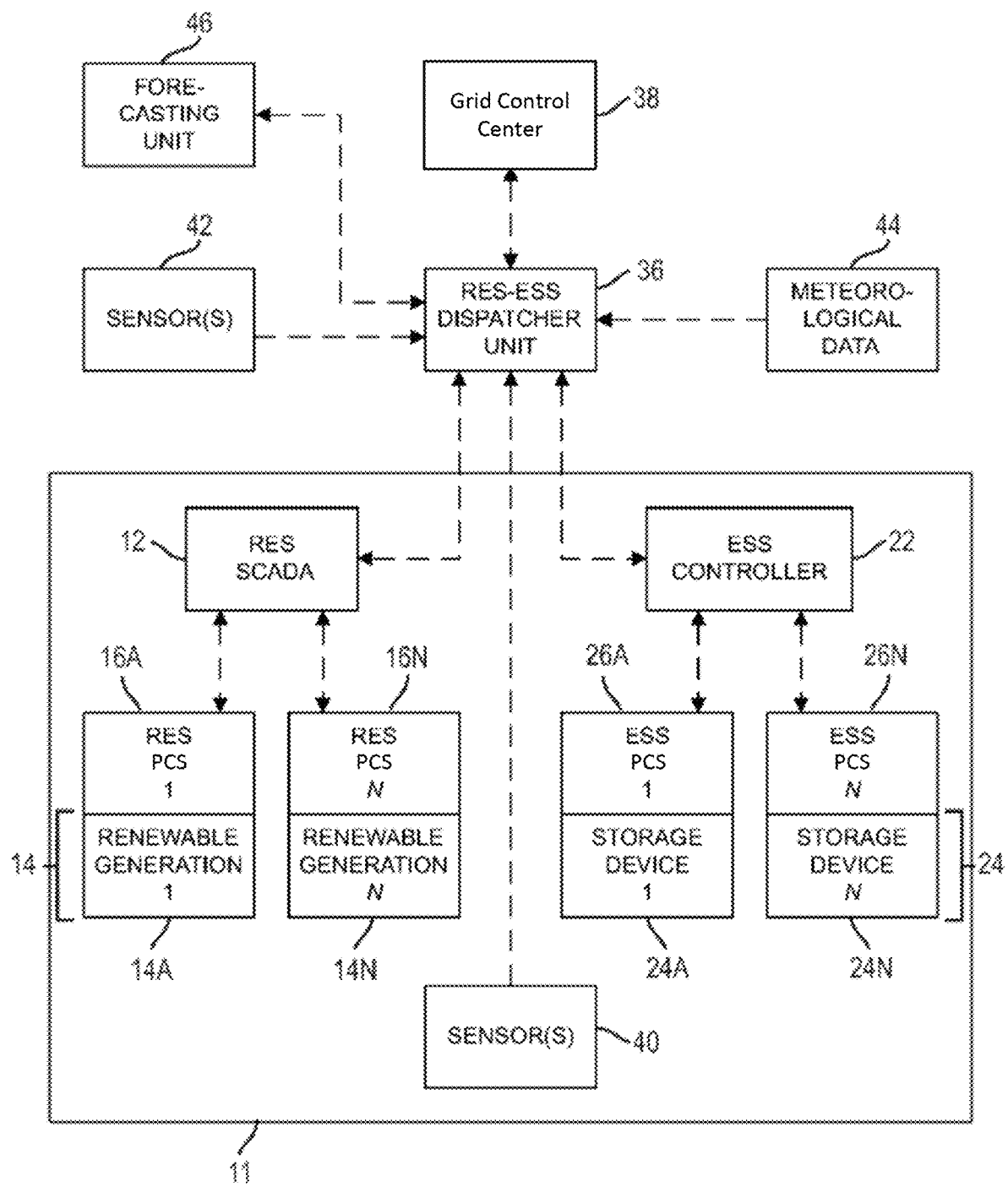
FIG. 1B is a schematic diagram showing certain components of the metering and control system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES-ESS dispatcher unit 36 may be arranged between a utility control center 38 and a RES-ESS facility 11. Within the RES-ESS facility 11, a RES SCADA controller 12 may be operatively coupled with RES PCS s 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES-ESS facility 11, an ESS controller 22 may be operatively coupled with ESS PCSs 26A-26N that are configured to provide AC conversion of DC power supplied by energy storage units 24A-24N (e.g., arrangeable as parts of an energy storage device 24). The RES-ESS facility 11 may further include at least one sensor 40, which may comprise one or more sky imaging sensors useful to determine sky conditions (such as the presence of clouds or lack thereof) proximate to the RES-ESS facility 11, with output signals from the at least one sensor 40 being supplied to the RES-ESS dispatcher unit 36. The RES-ESS dispatcher unit 36 may also receive: (i) signals from one or more sensors 42 (e.g., satellite imaging sensors or the like) not necessarily associated with the RES-ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES-ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
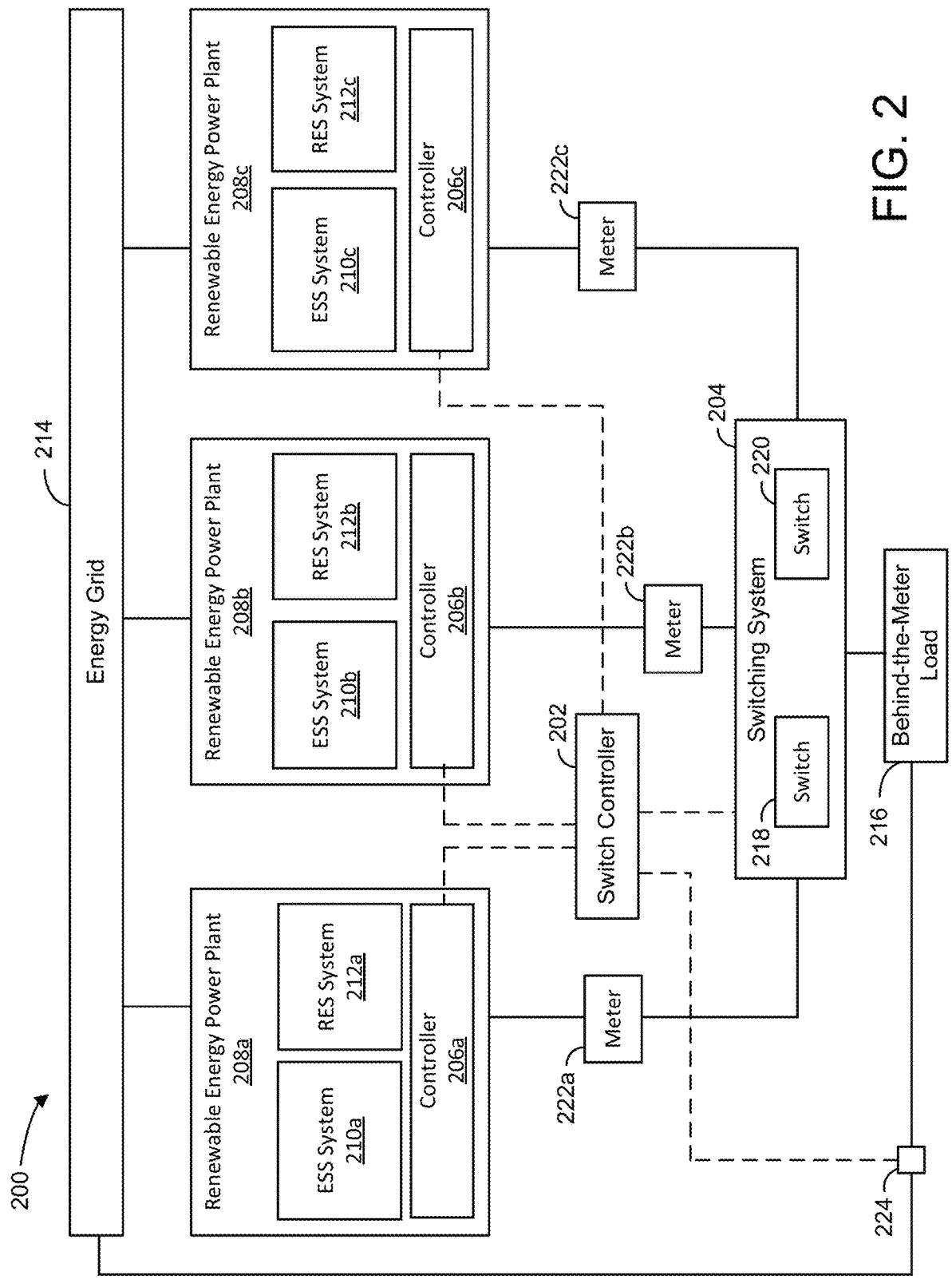
FIG. 2 illustrates an example system for transferring a behind-the-meter load between renewable energy power plants, according to some embodiments.

Referring now to FIG. 2, a system 200 for transferring a behind-the-meter load between renewable energy power plants is shown, in accordance with some embodiments of the present disclosure. As described herein, renewable energy facility and renewable energy power plant are used interchangeably. In brief overview, the system 200 can include a switch controller 202 that communicates with a switching system 204 and/or controllers 206a-c (individually, controller 206, and collectively, controllers 206). The controllers 206 can separately control and/or monitor energy that is generated in, stored in, and/or curtailed by renewable energy power plants 208a-c (individually, renewable energy power plant 208, and collectively, renewable energy power plants 208) of which the controllers 206 are a part. In doing so, the controllers 206 can respectively monitor and/or control ESS systems 210a-c (individually, ESS system 210, and collectively, ESS systems 210) and/or RES systems 212a-c (individually, RES system 212, and collectively, RES systems 212) of the respective renewable energy power plants 208. The renewable energy power plants 208 can discharge energy to an energy grid 214 and/or receive energy from the energy grid 214. The switch controller 202 can adjust the switching position of the switching system 204 such that the renewable energy power plants 208 can separately power a behind-the-meter load 216. The switch controller 202 can do so, for example, by determining which renewable energy power plants have available energy, are curtailing energy, or have lower-value energy and controlling the switching system 204 to connect such renewable energy power plants 208 with the behind-the-meter load 216. The system 200 may include more, fewer, or different components than shown in FIG. 2. For example, there may be any number of client devices or computers that make up or are a part of the switch controller 202, any number of networks in the system 200, and/or any number of renewable energy power plants 208 in the system 200. As illustrated in the FIGS. described herein, dashed lines between components may indicate communication connections between devices. Solid lines can indicate physical electrical connections between devices.

The energy grid 214 can be a utility grid. The energy grid 214 can be similar to or the same as the grid 34, shown and described with reference to FIG. 1A. The energy grid 214 can be operated separately from the renewable energy power plants 208. The energy grid 214 can include a grid controller (e.g., a grid operator) that can communicate with the controllers 206 of the renewable energy power plants 208 to determine how much energy to receive from the renewable energy power plants 208 and/or discharge to the renewable energy power plants 208 over different time periods (e.g., according to different charging and/or discharging schedules or bids (e.g., selected bids) for the renewable energy power plants 208). The energy grid 214 can be connected to other loads to distribute energy that the energy grid 214 receives from the different renewable energy power plants 208.

The renewable energy power plants 208 can be configured to store and/or generate energy. The renewable energy power plants can be the same as or similar to the RES-ESS facility 11, shown and described with reference to FIGS. 1A and 1B. The renewable energy power plants 208 can store energy in the ESS system 210 of the respective renewable energy power plants 208 and generate energy with the RES systems 212 of the respective renewable energy power plants 208. The renewable energy power plants 208 can operate according to charging/discharging schedules that allow the renewable energy power plants 208 to meet the energy demands of different offtakers (e.g., entities with which the renewable energy power plants 208 have a power purchase agreement (PPA)) and/or the energy grid 214.

The individual ESS systems 210 can be or include an ESS with one or more energy storage devices (e.g., such as the energy storage device 24). The ESS system 210 can include PCSs (e.g., the PCSs 26) electrically coupled with the energy storage devices. The ESS system 210 of a renewable energy power plant 208 can be configured to store energy that can be discharged to the energy grid 214 and/or to power devices (e.g., heating, ventilation, or air conditioning devices) of the renewable energy power plant 208.

The individual RES systems 212 can be or include one or more renewable energy sources (RESs), such as the energy generation devices 14. The renewable energy sources can be or include any type of renewable energy source, such as a solar energy source, a hydrogen energy source, a wind energy source, a hydroelectric energy source, etc. The RES systems 212 can include one or more PCSs electrically coupled with the energy generation devices (e.g., the PCSs 16). The RES system 212 of a renewable energy power plant 208 can be configured to generate energy that can be discharged to the energy grid 214 and/or to power the devices of the renewable energy power plant 208.

In some embodiments, the controllers 206 and the RES systems 212 can curtail energy that the RES systems 212 generate. For example, a controller 206 can continuously monitor the energy generation output from the renewable energy sources of an RES system 212, along with real-time grid demand, energy prices, and user-defined energy consumption parameters. Based on this data, the controller 206 can dynamically adjust the output from the renewable energy sources to curtail energy production during periods of low demand or excess generation and ramp up production during periods of high demand. By curbing the energy output of the renewable energy sources, the controller 206 and RES system 212 can avoid over-generation and waste of energy or equipment damage and minimize the need for energy storage and other equipment needed to store or propagate energy.

The individual controllers 206 can be computers that are configured to monitor and control the various components of the respective renewable energy power plants 208 in which the controllers 206 are located. The individual controllers 206 can monitor various sensors of renewable energy power plants 208 to determine the health and/or the status of the energy storage devices (e.g., the ESSs) of the ESS systems 210 and/or the energy generation units (e.g., the RESs) of the RES systems 212. The controllers 206 can determine the current state-of-charge of the ESSs of the ESS systems 210 and/or energy generation by the RES systems 212. The controllers 206 can set a maximum limit of energy generated by individual renewable energy sources of the RES systems 212 and/or the respective individual RES systems 212. In doing so, the controllers 206 may cause curtailment of energy generated by the RES s of the RES systems 212. Additionally, the controller 206 can control energy charge and discharge to the energy grid 214 and/or to other offtakers, such as according to agreements with the system operator (e.g., selected bids) and/or other offtakers.

The controllers 206 can transmit energy data to the switch controller 202. The energy data can be or include data that indicates an amount of energy that is available for transfer to the behind-the-meter load 216 at the current time and/or for one or more times in the future. In one example, a controller 206 can determine the amount of energy that is available for transfer to the behind-the-meter load 216 to be the current amount of energy that is being curtailed at the renewable energy power plant 208 that the controller 206 is controlling. The controller 206 can determine the amount of energy that is being curtailed by polling sensors monitoring the amount of energy that an RES system 212 of the renewable energy power plant 208 generates over time. In another example, a controller 206 can determine an amount of energy that is available for transfer to the behind-the-meter load 216 to be any excess energy that the renewable energy power plant 208 generated and/or has stored in an ESS system 210 of the renewable energy power plant 208. The controller 206 can determine the excess energy to be the amount of energy that the renewable energy power plant 208 has stored after satisfying any requirements or obligations that the renewable energy power plant 208 has to the energy grid 214 or any other offtakers or to satisfy the energy requirements of devices within the respective renewable energy power plants 208. The controller 206 can determine the excess amount by monitoring or polling sensors of the ESS system 210 of the renewable energy power plant 208 that indicate the current state of charge of the ESS of the ESS system 210. The controllers 206 can determine such information as energy data and transmit the energy data to the switch controller 202.

The controllers 206 can transmit energy data to the switch controller 202 at set time intervals, in some embodiments. For example, a controller 206 can poll the sensors of an RES system 212 and/or an ESS system 210 of a renewable energy power plant 208 at set time intervals. When polling the RES system 212, the controller 206 can identify the amount of energy that the RES system 212 is generating and the limit (e.g., a limit stored in memory of the controller 206) to the amount of energy that the RES system 212 is configured to output. The controller 206 can determine the amount of energy that is being curtailed to be the difference between the two identified values. The determined amount can be energy that is available to be transferred to the behind-the-meter load 216. In another example, the controller 206 can poll the sensors of an ESS system 210 of the renewable energy power plant 208. In doing so, the controller 206 can identify the amount of energy that is stored in the ESS system 210 (e.g., in the ESS of the ESS system 210). The controller 206 can identify the amount of energy that the renewable energy power plant 208 has committed to provide to the energy grid 214 and/or any other offtakers. The controller 206 can determine the amount of energy that is available from the ESS system 210 to be the difference between the amount of energy that is committed for provisioning to the energy grid 214 and/or any other offtakers and the amount of energy that is stored in the ESS system 210. The controller 206 can transmit energy data to the switch controller 202 as the amount of energy that is available from the RES system 212, the amount of energy that is available from the ESS system 210, and/or a combination of the two amounts.

In some embodiments, the controller 206 can include value (e.g., cost) information in the energy data that the controller 206 transmits to the switch controller 202. The value information can be or include value information of energy stored in the ESS system 210 and/or generated by the RES system 212. The controller 206 can identify such value information from memory. For example, the controller 206 can store value information indicating the value of directing energy from an RES system 212 to behind-the-meter loads and/or the value of directing energy from an ESS system 210 to behind-the-meter loads. The value may indicate the cost (which may be an opportunity cost) of provisioning the specific types of energy, or energy in general, to a behind-the-meter load. The controller 206 can transmit such values to the switch controller 202 with the amounts of available energy that the controller 206 determines for the ESS system 210 and/or the RES system 212.

The controllers 206 can transmit energy data to the switch controller 202 in messages. The messages can include values indicating the amount of energy that is available from an ESS system, an RES system, and/or a combination of the two systems, in some cases with identifiers indicating the types of the energy. The message can also include values of the amount or amounts of energy indicating the cost of providing the energy to the behind-the-meter load 216. The messages can include identifications (e.g., alphanumerical strings or identifiers) of the renewable energy power plants 208 for which the controllers 206 are respectively transmitting the messages and that correspond with the energy data. In some embodiments, the controllers 206 can include a time period for which the energy data is valid before it will become stale.

The behind-the-meter load 216 can be or include any device that can be powered by energy. The behind-the-meter load 216 can be a load that is directly powered by renewable energy sources or an energy storage system of a renewable energy power plant 208 without the energy being intermingled with energy in the energy grid 214. The load can be or include a residential or a commercial building. The behind-the-meter load 216 can be an industrial load, a transportation load, an agricultural load, an institutional load, a utility load, a data center load, etc. In some embodiments, the load can be a load that does not need to be powered at all times or can operate as needed while receiving intermittent or unpredictable energy. Accordingly, the behind-the-meter load 216 can be configured to operate as the amount of available energy changes between the renewable energy power plants 208.

The switching system 204 can be configured to selectively connect the behind-the-meter load 216 with the renewable energy power plants 208. The switching system 204 can be or include switches 218 and 220 and/or any number of switches. In some embodiments, the switching system 204 can include a controller that controls the switches 218 and 220 of the switching system 204. The controller can receive control signals from the switch controller 202 and operate the switches 218 and 220 according to the control signals. In some cases, the switching system 204 is a series of physical switches that are directly controlled by control signals from the switch controller 202 without a separate controller. In some embodiments, the switching system 204 can connect (e.g., operationally couple) the behind-the-meter load 216 to a single renewable energy power plant 208 (e.g., a bus of an ESS system 210 of the renewable energy power plant 208, a bus of an RES system 212 of the renewable energy power plant 208, or a bus that is common to the ESS system 210 and the RES system 212 of the renewable energy power plant 208) at a time such that energy is not concurrently distributed by multiple renewable energy power plants 208 to the behind-the-meter load 216 (e.g., to comply with jurisdictional regulations or contractual requirements, if any). In some embodiments, the switching system 204 can connect the behind-the-meter load 216 with multiple renewable energy power plants 208 such that the behind-the-meter load 216 is powered by multiple renewable energy power plants 208 at a time. The switching system 204 can receive output energy from the renewable energy power plant 208 to which the switching system 204 is coupling the behind-the-meter load 216 and power or provide energy to the behind-the-meter load 216 with the output energy. The switching system 204 can rotate which renewable energy power plants 208 power the behind-the-meter load 216 at different times to reduce energy waste at the respective renewable energy power plants 208 and to increase or ensure uptime of the behind-the-meter load 216.

The switches 218 and 220 can be or include any type of switch or switching mechanism. For example, the switches 218 and 220 can be or include physical switches that physically connect the behind-the-meter load 216 with different renewable energy power plants 208. In another example, the switches 218 can be or include power flow devices. As described herein, a power flow device can be a device that controls the flow of power or energy to or from the different renewable energy power plants 208 to the behind-the-meter load 216. Examples of power flow devices can include power conversion systems (PCS s), such as inverters, AC-to-AC converters, DC-to-DC converters, etc. The individual switches 218 and 220 can be configured to selectively connect the behind-the-meter load 216 to individual renewable energy power plants 208. For example, the switch 218 can be configured to operate in two states: a first state, or a connected state, in which the switch 218 facilitates energy transfer between the behind-the-meter load 216 and the renewable energy power plant 208a (e.g., from the renewable energy power plant 208 to the behind-the-meter load 216), and a second state, or a disconnected state, in which the switch 218 is disconnected or is otherwise configured or positioned to not facilitate energy transfer between the behind-the-meter load 216 and the renewable energy power plant 208. The switch 220 can similarly be configured to connect or disconnect the behind-the-meter load 216 from the renewable energy power plant 208b. The switching system 204 can include any number of such switches that can connect or disconnect the behind-the-meter load 216 from any number of renewable energy power plants 208.

The switching system 204 can be controlled to be in different switching positions. A switching position can be or indicate a state of the switches (e.g., the switches 218 and 220) within the switching system 204. Each switching position can indicate a different permutation or combination of the states of the switches of the switching system 204. For example, in a first switching position, the switch 218 can be in a connected state to connect the behind-the-meter load 216 with the renewable energy power plant 208a. Each other switch of the switching system 204 can be disconnected in the first switching position. In a second switching position, the switch 220 can be in a connected state to connect the behind-the-meter load 216 with the renewable energy power plant 208b. Each other switch of the switching system 204 can be disconnected in the second switching position. Any number of switches can be in a connected state in a switching position. The switching system 204 can be configured to be in each permutation or combination of switching positions in which one or more of the switches of the switching system 204 are in a connected state with a renewable energy power plant 208.

In some embodiments, the switching system 204 may be configured such that only one switch of the switching system 204 is in a connected state at a time (e.g., such that the behind-the-meter load 216 is only connected with one renewable energy power plant 208 at a time). Such may be the case, for example, in jurisdictions where concurrently intermingling of energy between renewable energy power plants 208 to power a behind-the-meter load is restricted or otherwise when agreements restrict such intermingling. Because, in some cases, energy can flow to and from the behind-the-meter load 216, multiple connections at once may enable or cause energy to be transferred between renewable energy power plants 208. By only connecting the behind-the-meter load 216 to one renewable energy power plant 208 at a time, the switching system 204 may avoid intermingling of energy between the renewable energy power plants 208.

In some embodiments, the switching system 204 can be in a switching position in which the behind-the-meter load 216 is connected to multiple renewable energy power plants 208. In such embodiments, the switching system 204 can connect or activate multiple switches between the behind-the-meter load 216 and the multiple renewable energy power plants 208. In doing so, the switching system 204 can operate to enable different renewable energy power plants 208 to provide different portions of energy to satisfy the real-time energy requirements of the behind-the-meter load 216.

The system 200 can include meters 222a-c (individually, meter 222, and collectively, meters 222). The meters 222 can be connected between the switching system 204 and respective renewable energy power plants 208. The meters 222 may each be or include an energy meter that is configured to read the amount of energy that is provided from the respective renewable energy power plants 208 to the behind-the-meter load 216. The meter 222 may generate positive or negative readings when energy is flowing from the respective renewable energy power plants 208 to the behind-the-meter load 216. The meters 222 may be similar to the RES electrical power meter 19 or the ESS electrical power meter 29, shown and described with reference to FIG. 1A.

In some embodiments, the switching system 204 can have multiple switches for individual renewable energy power plants 208. The switches may respectively correspond to a connection between the behind-the-meter load 216 and an ESS system 210 of a renewable energy power plant 208 and a connection between the behind-the-meter load 216 and an RES system 212 of the same renewable energy power plant 208. Each connection may correspond to its own meter 222. In this configuration, the ESS system 210 and the RES system 212 may operate as separate renewable energy power plants 208 as described herein. A controller 206 of a renewable energy power plant 208 with separate connections may provide energy data for the ESS system 210 (e.g., excess stored in energy by the ESS of the ESS system 210) and for the RES system 212 (e.g., an amount of energy being curtailed by the RES system 212). The switch controller 202 can separately control the switches of the switching system 204 for the ESS system 210 and the RES system 212 based on the energy of the respective systems 210 and 212. All or any number of renewable energy power plants 208 may be configured or connected with the behind-the-meter load 216 in this manner.

The switch controller 202 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The switch controller 202 can include or utilize at least one processing unit or other logic device such as a programmable logic array engine or a module configured to communicate with one another or other resources or databases. The components of the switch controller 202 can be separate components or a single component. The switch controller 202 and its components can include hardware elements, such as one or more processors, logic devices, or circuits.

The switch controller 202 may comprise one or more processors that are configured to monitor the different renewable energy power plants 208 (e.g., monitor the energy availability or energy generation at the respective renewable energy power plants 208) and/or control the switching position of the switching system 204. The switch controller 202 may comprise a communications interface, a processor, and/or memory. The switch controller 202 may communicate with the controllers 206 and/or the switching system 204 via the communications interface, as is illustrated by the dashed lines in FIG. 2. In some cases, the switch controller 202 can communicate with the different components via an application programming interface (API). The processor of the switch controller 202 may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in the memory of the switch controller 202 to facilitate the activities described herein. The memory may be any volatile or non-volatile computer-readable storage medium capable of storing data or computer code. The memory may be or include non-transitory memory.

In brief overview, the switch controller 202 may operate according to the amount of energy that is available for transfer to the behind-the-meter load 216 at individual renewable energy power plants 208. In doing so, the switch controller 202 can receive energy data from the different renewable energy power plants 208 indicating the amount of energy that is available for transfer to the behind-the-meter load 216. The switch controller 202 can determine energy data from one or more of the renewable energy power plants 208 satisfies a condition. Responsive to the determination, the switch controller 202 can adjust a switching position of the switching system 204 such that the behind-the-meter load 216 is only connected or operationally coupled with the renewable energy power plants 208 that provided the energy data that satisfied the condition. The switch controller 202 can repeat the process over time adjusting the switching position of the switching system 204 such that the behind-the-meter load 216 is powered with energy data from different renewable energy power plants 208 that satisfy a condition. In this way, the switch controller 202 can operate to reduce wasting renewable energy at the renewable energy power plants 208 while ensuring the behind-the-meter load 216 remains powered.

The switch controller 202 may store, in memory, programmable instructions that, upon execution, cause a processor of the switch controller 202 to monitor the renewable energy power plants 208 and control energy distribution from the renewable energy power plants 208 to the behind-the-meter load 216 between the different renewable energy power plants 208. For example, the switch controller 202 can be configured to monitor the renewable energy power plants 208. The switch controller 202 can monitor the renewable energy power plants 208 by polling or by otherwise communicating with the controllers 206 of the renewable energy power plants 208. For example, the switch controller 202 can establish communication sessions and/or connections with the controllers 206 of the renewable energy power plants 208. The communication sessions and/or the messages transmitted over the communication sessions are represented by the dashed lines in FIG. 2. Over the communication sessions, the controllers 206 can transmit messages to the switch controller 202 indicating energy data that the controllers 206 have determined or identified indicating the amount of energy that is available at the renewable energy power plants 208 that the controllers 206 respectively control.

In some embodiments, the controllers 206 can transmit the messages to the switch controller 202 responsive to detecting an energy event. An energy event may indicate a sudden change (e.g., increase and/or decrease) in the amount of energy that is available at a particular renewable energy power plant 208. For example, a controller 206 can detect an ESS of an ESS system 210 is experiencing an error and cannot discharge energy properly. Responsive to the detection, the controller 206 can transmit a message to the switch controller 202 indicating the amount of energy that is available from the ESS is now zero. In another example, a controller 206 can detect a surge in the amount of energy an RES system 212 is generating, such as from a sudden increase in sunlight. Responsive to detecting the surge, the controller 206 can determine a new amount of energy that is available from the RES system 212 and/or from a combination of the RES system 212 and an ESS system 210 of the same renewable energy power plant 208 and transmit the determined value to the switch controller 202 as energy data. The controller 206 can transmit energy data to the switch controller 202 responsive to detecting any energy event. In some embodiments, the controllers 206 can additionally or instead generate and transmit energy data to the switch controller 202 at set time intervals.

In some embodiments, the controllers 206 can transmit the messages to the switch controller 202 responsive to receiving a message from the switch controller 202. For example, the controllers 206 can generate energy data for the renewable energy power plants 208 that the controllers 206 respectively control. Upon doing so, the controllers 206 can store the energy data in memory. The switch controller 202 can poll the controllers 206 pseudo-randomly or at set time intervals requesting energy data of the individual renewable energy power plants 208. Upon receiving the requests, the controllers 206 can query memory (e.g., memory of the respective controllers 206) to retrieve the previously generated energy data. The controllers 206 can respond to such queries with messages including the retrieved energy data.

In some embodiments, the switch controller 202 can generate energy data for the renewable energy power plants 208 directly (e.g., without communicating with a controller 206 at the renewable energy power plant 208). For example, the switch controller 202 can monitor sensors or communicate with devices at the different renewable energy power plants 208 to determine an amount of available energy that is available at the ESS systems 210 and/or the RES systems 212 of the renewable energy power plants 208. The switch controller 202 can do so in a similar manner to how the controllers 206 can monitor and/or communicate with the devices of the renewable energy power plant 208.

The switch controller 202 can determine energy data from a renewable energy power plant 208 satisfies a condition. For example, the switch controller 202 can determine energy data from a renewable energy power plant 208 satisfies a condition responsive to determining the energy data indicates or includes a value of available energy at the renewable energy power plant 208 that exceeds zero. In another example, the switch controller 202 can determine energy data from a renewable energy power plant 208 satisfies a condition responsive to determining the energy data includes a highest amount of the amounts of available energy that the switch controller 202 receives from each of the renewable energy power plants 208. For instance, the switch controller 202 can receive energy data from multiple renewable energy power plants 208. The switch controller 202 can store the energy data in memory upon receipt of the memory data, in some cases with time stamps indicating the time of generation or receipt of the energy data. The switch controller 202 can compare the indications of available energy in the energy data (e.g., the energy data with the most recent timestamps) from the respective renewable energy power plants 208. Based on the comparison, the switch controller 202 can identify the renewable energy power plant 208 that provided energy data indicating the highest amount of available energy for transfer to the behind-the-meter load 216. In another example, the switch controller 202 can determine energy data from a renewable energy power plant 208 satisfies a condition responsive to determining a value (e.g., cost) of the available energy is the lowest of the values of energy of the energy data that the switch controller 202 receives from each of the renewable energy power plants 208. For example, the switch controller 202 can receive energy data from multiple renewable energy power plants 208. The switch controller 202 can compare the values of energy in the energy data from the respective renewable energy power plants 208. Based on the comparison, the switch controller 202 can identify the renewable energy power plant 208 that provided energy data indicating the lowest value of energy in the energy data received by the switch controller 202. In another example, in some embodiments, the switch controller 202 may determine energy data of a renewable energy power plant 208 satisfies (e.g., only satisfies) a condition when the value of available energy exceeds or otherwise satisfies the energy requirements of the behind-the-meter load 216.

In one example, the one or more conditions can include a condition that is satisfied when there is any amount of curtailed energy indicated in energy data from a renewable energy power plant 208. In another example, the one or more conditions can include a condition that is satisfied when an amount of curtailed energy exceeds a threshold (e.g., a defined threshold). In another example, the one or more conditions can include a condition that is satisfied when an amount of curtailed energy exceeds a threshold (e.g., the same threshold) for a duration (e.g., a defined duration) of time.

In another example, the switch controller 202 can execute an objective function or an optimization function (e.g., an optimization model) to determine a condition is satisfied. For example, the switch controller 202 can receive energy data from each of the renewable energy power plants 208. The energy data for each of the renewable energy power plants 208 can include an amount of energy that is available and a value for the energy. The switch controller 202 can execute an optimization model (e.g., a linear programming model, a nonlinear programming model, a constraint programming model, etc.) using the amounts of available energy and the corresponding values of energy as an input. The optimization model can be weighted (e.g., manually weighted) based on inputs from a user. The switch controller 202 can execute the optimization model to maximize the output of the optimization model based on the input. For example, the switch controller 202 can execute the optimization model to cause the optimization model to output a ranked list of renewable energy power plants 208 indicating an order in which renewable energy power plants 208 maximize an optimization function based on the energy data the renewable energy power plants 208 provide to the switch controller 202. The switch controller 202 can determine the first renewable energy power plant 208 of the ranked list corresponds to the energy data that satisfies the condition.

Responsive to determining energy data (e.g., first energy data) of a renewable energy power plant 208 (e.g., a first renewable energy power plant) satisfies a condition, the switch controller 202 can determine a switching position for the switching system 204. The switch controller 202 can do so, for example, by identifying a switching position in which the behind-the-meter load 216 is connected or otherwise operationally coupled with the renewable energy power plant 208. For example, the switch controller 202 can store configurations for different switching positions in memory. Each switching position may correspond to a different switch connecting or operationally coupling the behind-the-meter load 216 with a different renewable energy power plant 208. The switch controller 202 can identify a switching position (e.g., a first switching position) in which a switch is in a connected state between the behind-the-meter load 216 and the renewable energy power plant 208 that corresponds with the energy data that satisfies a condition. In some cases, the switch connecting the behind-the-meter load 216 and the renewable energy power plant 208 associated with the energy data that satisfies the condition is the only switch in the connected state to avoid connecting different renewable energy power plants 208 together.

The switch controller 202 may transmit control signals or otherwise control the switching system 204. The switch controller 202 can transmit control signals to the switching system 204 to change or adjust the state, positioning, or configurations of the switches (e.g., the switches 218 and 220) of the switching system 204. The switch controller 202 can transmit control signals to the switching system 204 to cause the switching system 204 to be in the switching position that the switch controller 202 selected from memory. For example, the switch controller 202 can select the first switching position in which the switch 218 connects (e.g., is closed) the behind-the-meter load 216 with the renewable energy power plant 208a and the switch 220 and any other switches of the switching system 204 are disconnected (e.g., are open). The switch controller 202 can transmit a control signal to the switching system 204 to cause the switches of the switching system 204 to be in the first switching position. The switching system 204 can receive the control signal and change position to direct energy output from the behind-the-meter load 216 to the renewable energy power plant 208a and not any other renewable energy power plants 208 in accordance with the switching positions of the control signal. In doing so, the switch controller 202 can enable the renewable energy power plant 208a and not any other renewable energy power plant 208 to provide energy to the behind-the-meter load 216.

In embodiments in which the switches of the switching system 204 are power flow devices, the switching positions in memory may correspond to whether the power flow devices are in an "on" state or an "off" state. For example, the switch controller 202 can determine to connect the behind-the-meter load 216 to the renewable energy power plant 208a through the switch 218, which may be a power flow device. To adjust the state of the switching system 204 to the switching position in which the behind-the-meter load 216 is connected with the renewable energy power plant 208a, the switch controller 202 can transmit a control signal to the switching system 204 to cause the power flow device connecting the behind-the-meter load 216 with the renewable energy power plant 208a to turn on (e.g., to be active or activated). The switch controller 202 can additionally or instead transmit control signals to each other power flow device of the switching system 204 to ensure each other power flow device is in the off state (e.g., to be inactive or deactivated). Accordingly, the switch controller 202 can control the power flow devices of the switching system 204 to enable the behind-the-meter load 216 to receive energy from specific renewable energy power plants 208 through a single active power flow device at a time and not through the inactive power flow devices.

The switch controller 202 can adjust the switching configuration of the switching system 204 to change the renewable energy power plants 208 from which the behind-the-meter load 216 receives energy over time. For example, subsequent to connecting the behind-the-meter load 216 with the renewable energy power plant 208a, the switch controller 202 can determine energy data received from the controller 206b satisfies a condition. The switch controller 202 can make the determination and determine a switching position (e.g., a second switching position) for the switching system 204 to connect the behind-the-meter load 216 with the renewable energy power plant 208b (e.g., disconnect the behind-the-meter load 216 from the renewable energy power plant 208a and connect the behind-the-meter load 216 with the renewable energy power plant 208b). The switch controller 202 can transmit a control signal to the switching system 204 to adjust the switching position of the switching system 204 from the first switching position to the second switching position. In the second switching position, the behind-the-meter load 216 can receive energy from the renewable energy power plant 208b instead of the renewable energy power plant 208a, in some embodiments.

The behind-the-meter load 216 may be coupled (e.g., selectively coupled) with the energy grid 214. The behind-the-meter load 216 may be coupled with the energy grid 214 through a switch 224. The switch 224 may be separate from or a part of the switching system 204. The switch 224 can be similar to one of the switches 218 or 220 of the switching system 204. The switch controller 202 can control the state of the switch 224 to connect and/or disconnect the behind-the-meter load 216 from the energy grid 214. The switch controller 202 can do so based on energy data that the switch controller 202 receives from the renewable energy power plants 208.

For example, the switch controller 202 can receive energy data from the renewable energy power plants 208. The energy data can indicate amounts of energy that are available at the respective renewable energy power plants 208. The switch controller 202 can aggregate the amounts of energy of the received energy data to determine or calculate a total amount of available energy. The switch controller 202 can compare the total amount of available energy with the energy requirements of the behind-the-meter load 216, which the switch controller 202 may have stored in memory. Responsive to determining the total amount of available energy is less than the energy requirements of the behind-the-meter load 216, the switch controller 202 can control the switching position of the switch 224 to close, activate, or otherwise enable the energy grid 214 to provide energy to the behind-the-meter load 216. In some embodiments, such as in embodiments in which the switch controller 202 only connects the behind-the-meter load 216 with one renewable energy power plant 208 at a time, the switch controller 202 can control the switching position of the switch 224 to close, activate, or otherwise enable the energy grid 214 to provide energy to the behind-the-meter load 216 responsive to determining there is not a single renewable energy power plant 208 that has enough available energy to satisfy the energy requirements of the behind-the-meter load 216. In such embodiments, the switch controller 202 can control the switch 224 and/or the switching system 204 such that the energy grid 214 is the only power source for the behind-the-meter load 216 or a renewable energy power plant 208 (e.g., a renewable energy power plant 208 selected for satisfying a condition) in combination with the energy grid 214 concurrently provide power to the behind-the-meter load 216, depending on any applicable jurisdiction, regulations, and/or agreements.

Depending on the embodiment (e.g., which may vary depending on any contractual or jurisdictional regulations), the switch controller 202 can control or adjust the switching system 204 such that the energy grid 214 alone powers the behind-the-meter load 216 through the switch 224, the energy grid 214 in combination with a single renewable energy power plant 208 (e.g., the renewable energy power plant 208 that provided energy data that the switch controller 202 determined satisfied a condition), the energy grid 214 in combination with multiple renewable energy power plants 208 (e.g., the renewable energy power plants 208 that provided energy data that the switch controller 202 determined satisfied a condition), or the energy grid 214 in combination with each renewable energy power plant 208 that provided energy data to the switch controller 202. Accordingly, the switch controller 202 can control the switch 224 to enable the behind-the-meter load 216 to remain operational when the renewable energy power plants 208 do not have enough available energy to sufficiently power the behind-the-meter load 216. The switch controller 202 can do so by causing the behind-the-meter load 216 to draw energy from the energy grid 214 through the switch 224 in addition to or instead of any renewable energy power plants 208 to which the behind-the-meter load 216 is connected through the switching system 204.

In some embodiments, the switch controller 202 can allocate portions of energy for different renewable energy power plants 208 to provide (e.g., concurrently provide) to the behind-the-meter load 216. For example, the switch controller 202 can receive energy data from the renewable energy power plants 208. The switch controller 202 can identify multiple renewable energy power plants 208 that provided energy data to the switch controller 202 that satisfies a condition. The switch controller 202 can identify the energy requirements of the behind-the-meter load 216. The switch controller 202 can determine allocations of energy for the different identified renewable energy power plants 208 that satisfy (e.g., at least meet) the energy requirements of the behind-the-meter load 216. The switch controller 202 can assign the allocations to the renewable energy power plants 208, such as by storing associations between the assigned allocations and identifications of the renewable energy power plants 208 that the switch controller 202 has stored in memory. The switch controller 202 can adjust the switching position of the switching system 204 to a switching configuration that enables the identified renewable energy power plants 208 (e.g., identified two or more renewable energy power plants 208) to provide energy to the behind-the-meter load 216 according to the assigned allocations.

The switch controller 202 can determine the allocations for the renewable energy power plants 208 in different ways. In one example, the switch controller 202 can determine equal allocations of energy for each of the identified renewable energy power plants 208 that provided energy data that satisfied the condition. The switch controller 202 can do so, for example, responsive to identifying multiple renewable energy power plants 208 that are associated with energy data that satisfies a condition, such as by having available energy, having amounts of available energy that exceed a threshold, having available energy with a value below a threshold, etc. In another example, the switch controller 202 can determine allocations based on a ranked order of the renewable energy power plants 208. For instance, the switch controller 202 can generate a ranked list of the renewable energy power plants 208 based on the amount of available energy the renewable energy power plants 208 can provide (e.g., the renewable energy power plant 208 that has the highest amount of available energy may be ranked the highest and the remaining renewable energy power plants 208 may be ranked in descending order) or based on an output of an objective or optimization function. The switch controller 202 can allocate 100% of the available energy of the highest ranked renewable energy power plant 208 and continue allocating 100% of the available energy to the next highest ranked renewable energy power plant 208 until the energy requirements of the behind-the-meter load 216 are satisfied. In some cases, the energy requirements of the behind-the-meter load 216 may be satisfied before the last renewable energy power plant 208 provides all of the available energy of the renewable energy power plant 208. In such cases, the switch controller 202 can assign the remaining amount of energy that is required from the last renewable energy power plant 208 for the energy requirements of the behind-the-meter load 216 to be satisfied. The switch controller 202 can determine allocations for the different renewable energy power plants 208 (e.g., the renewable energy power plants 208 identified as satisfying a condition) in any manner.

In one example, the switch controller 202 can identify an amount of available energy for each of the plurality of renewable energy power plants 208 from the energy data received from each of the controllers 206. The switch controller 202 can select the two or more renewable energy power plants 208 responsive to determining the amount of available energy (e.g., in the aggregate and/or each individually) for the two or more renewable energy power plants 208 satisfy the energy requirements of the behind-the-meter load 216. The switch controller 202 can determine and/or assign the allocations of energy to the two or more renewable energy power plants 208 such that the allocations satisfy (e.g., exceed or equal) the energy requirements of the behind-the-meter load 216.

The switch controller 202 can adjust the switching position of the switching system 204 to provide energy to the behind-the-meter load 216 according to the assigned allocations using power flow devices as switches in the switching system 204. For example, the switching system 204 can include multiple power flow devices. Each of the power flow devices can be configured to activate or deactivate to couple or disconnect the behind-the-meter load 216 with a different renewable energy power plant 208. The power flow devices can be PCS s, for example. The switch controller 202 can adjust the switching position of the switching system 204 to enable two or more renewable energy power plants 208 for which the switch controller 202 determined allocations of energy to provide to the behind-the-meter load 216. The switch controller 202 can adjust the switching position of the switching system 204 by causing two or more power flow devices connected between the two or more renewable energy power plants 208 and the behind-the-meter load 216 to be activated to connect the behind-the-meter load 216 with the two or more renewable energy power plants 208. The switch controller 202 can do so, for example, by transmitting one or more control signals to the two or more power flow devices or the switching system 204 that cause the two or more power flow devices to draw amounts of energy equal to the allocations determined for the renewable energy power plants 208 connected to the behind-the-meter load 216 through the respective power flow devices. In some embodiments, in doing so, the switch controller 202 can control each other power flow device of the switching system 204 to be inactivated.

In some embodiments, the switch controller 202 can determine which renewable energy power plant 208 to connect with the behind-the-meter load 216 based on energy forecasts indicating predictions of the amount of energy the different renewable energy power plants 208 will generate over a future time period (e.g., a day, a wee, a month, etc.). For example, the energy data that the controllers 206 transmit to the switch controller 202 can include forecast energy data indicating a prediction of the amount of energy that will be available for transfer to the behind-the-meter load 216 over a future time period. The controllers 206 can determine such forecasts, for example, based on an amount of energy that is currently stored by the respective renewable energy power plants 208 (e.g., an amount of energy that is currently stored in the ESS systems 210 of the respective renewable energy power plants 208), forecasts of the amount of energy the RES systems 212 of the renewable energy power plants 208 will respectively generate over the future time period, and for any commitments of energy that the renewable energy power plants 208 have to the energy grid 214 and/or any offtakers over the time future time period. The controllers 206 can each execute a function such as currently stored energy+forecast energy to be generated during the future time period−energy commitments=available energy for the future time period. The controllers 206 can transmit the output of the function to the switch controller 202 in energy data as forecast available energy in addition to or instead of any other energy data as described herein.

The switch controller 202 can determine which renewable energy power plants 208 to connect with the behind-the-meter load 216 based on the amount of available energy for the future time period (e.g., the predicted amount of available energy) that the switch controller 202 receives in energy data from the renewable energy power plants 208. For example, the switch controller 202 can compare the amount of available energy for the future time period to the same conditions and/or using the same optimization or objective functions as described with respect to energy that is available (e.g., currently available) for transfer from the different renewable energy power plants 208 to the behind-the-meter load 216. The switch controller 202 can determine allocations for the renewable energy power plants 208 based on the amounts of available energy for the future time period as described above. The switch controller 202 can control the switching system 204 based on the identified renewable energy power plants 208 and/or according to the allocations of energy for the renewable energy power plants 208. In this way, the switch controller 202 can pre-emptively connect the behind-the-meter load 216 with the renewable energy power plants 208 to ensure the behind-the-meter load 216 can be powered based on the amount of the energy that forecast to be available in the future, which may reduce the number of adjustments in switching configuration that are required to keep the behind-the-meter load 216 operational.

In some embodiments, the switch controller 202 can adjust the switching position of the switching system 204 responsive to a controller 206 detecting an energy event at a renewable energy power plant 208 the controller 206 is controlling. For example, a controller 206 of a renewable energy power plant 208 can detect an energy event at the renewable energy power plant 208, such as a sudden malfunction in an ESS system 210 of the renewable energy power plant 208 or a sudden increase in the amount of energy being produced by an RES system 212 of the renewable energy power plant 208. Based on the energy event, the controller 206 can transmit energy data to the switch controller 202. The controller 206 may retrieve, from memory, the most recently received energy data from the different renewable energy power plants 208 in response to receiving the energy data from controller 206. Using the systems and methods described herein, the controller 206 can determine which of the energy data satisfies a condition, using the newly received energy data from the controller 206 instead of any previously received energy data from the controller 206. The controller 206 may update the switching position of the switching system 204 according to the determination, which may include changing the switching position to connect the behind-the-meter load 216 with one or more different renewable energy power plants 208 or maintaining the same switching position of the switching system 204. Accordingly, the switch controller 202 can account for unexpected events at the different renewable energy power plants 208 that may affect how the behind-the-meter load 216 is powered.

In one non-limiting example, the switch controller 202 can use an optimization model to determine which renewable energy power plants 208 to connect with the behind-the-meter load 216. For example, the switch controller 202 can identify energy data that the switch controller 202 has received from different renewable energy power plants 208. The energy data can include an amount of available energy at the respective renewable energy power plants 208, a value of energy of the available energy at the renewable energy power plants 208, and/or a forecast amount of available energy for a future time period at the renewable energy power plants 208. The scores can be determined based on any metrics of generation and/or storage at the renewable energy power plants 208. The switch controller 202 can execute the optimization model to determine scores for the renewable energy power plants 208 that provided the energy data. The switch controller 202 can compare the scores and connect the behind-the-meter load 216 to the renewable energy power plant 208 that is associated with the highest score. Thus, the switch controller 202 can optimize the renewable energy power plants 208 that provide the behind-the-meter load 216 with available energy.

The switch controller 202 can use the scores for the renewable energy power plants 208 to determine which renewable energy power plant 208 to connect with the behind-the-meter load 216 through the switching system 204 over time. For example, subsequent to connecting the behind-the-meter load 216 with a first renewable energy power plant 208 (e.g., at a defined time interval after connecting the behind-the-meter load 216 with the first renewable energy power plant 208), the switch controller 202 can receive energy data (e.g., subsequent energy data) from the renewable energy power plants 208. The switch controller 202 can execute the optimization model using the subsequently received energy data to determine scores for the renewable energy power plants 208. The switch controller 202 can compare the scores of the renewable energy power plants 208. The switch controller 202 can identify the renewable energy power plant 208 with a score that satisfies a condition, such as having the highest score of the renewable energy power plants 208 connected with the behind-the-meter load 216 through the switching system 204. Responsive to determining a score (e.g., a second score) for a second renewable energy power plant 208 satisfies a condition, the switch controller 202 can adjust the switching position of the switching system 204 to connect the behind-the-meter load 216 with the second renewable energy power plant 208 (e.g., and not the first renewable energy power plant 208) for the second renewable energy power plant 208 to power the behind-the-meter load 216. The switch controller 202 can continually (e.g., at set intervals) perform this optimization function over time and adjust the switching position of the switching system 204 over time to optimize the provision of energy to power the behind-the-meter load 216.

In some embodiments, the switch controller 202 can use the optimization model to select multiple renewable energy power plants 208 to connect with the behind-the-meter load 216. For example, the switch controller 202 can execute the optimization model to determine scores for multiple renewable energy power plants 208. The switch controller 202 can compare the scores and identify a defined number of renewable energy power plants 208 that satisfy a condition, such as a defined number of renewable energy power plants 208 with the highest scores and/or a number of renewable energy power plants 208 with scores that exceed or otherwise satisfy a threshold (e.g., a defined threshold). The switch controller 202 can select and/or connect the behind-themeter load 216 with the renewable energy power plants 208 with scores that satisfy such a condition.

In some embodiments, the switch controller 202 can allocate amounts of energy to provision to the behind-the-meter load 216 based on the scores generated by the optimization model. For example, the switch controller 202 can allocate higher amounts of energy to renewable energy power plants 208 that satisfy a condition as described above and that have higher scores of the renewable energy power plants 208 with scores that satisfy the condition. In some embodiments, the allocations may be proportional to the scores of such renewable energy power plants 208 compared with each other. The switch controller 202 can determine the allocations and control power flow devices of the switching system 204 according to the allocations to satisfy the energy requirements of the behind-the-meter load 216.

Figure 3:
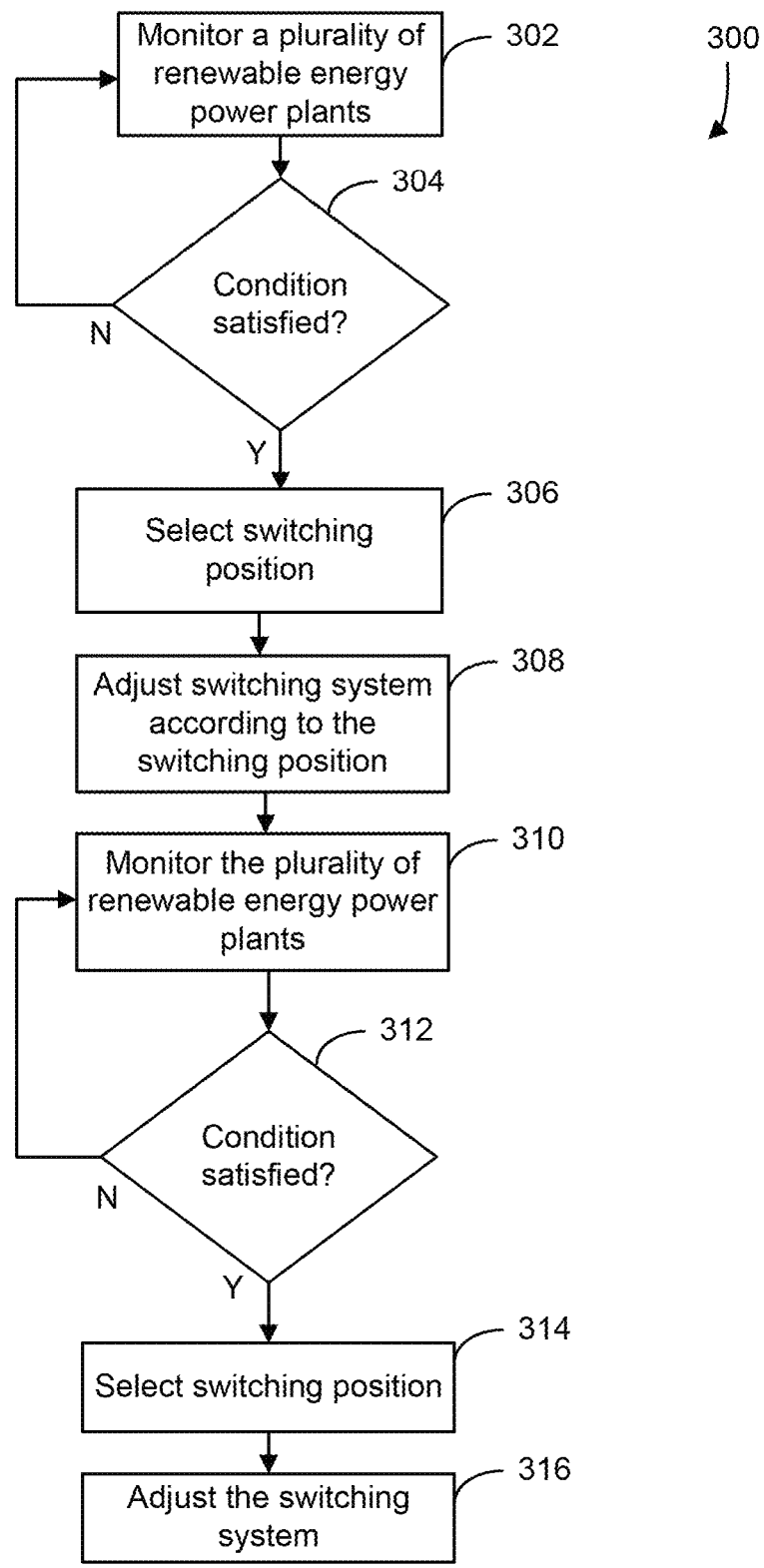
FIG. 3 illustrates a flowchart of an example method for transferring a behind-the-meter load between renewable energy power plants, according to some embodiments.

FIG. 3 illustrates a method 300 for transferring an energy source between renewable energy power plants, according to some embodiments. The method 300 can be performed by a data processing system (e.g., a controller, the RES–ESS dispatcher unit 36, the ESS controller 22, the RES SCADA controller 12, the computer 500, the switch controller 202, one or more of the controllers 206, etc.). In some embodiments, the data processing system is the controller of a system that contains a behind-the-meter load and a switching system that selectively connects the behind-the-meter load to different renewable energy power plants. The data processing system may monitor different renewable energy power plants to which the switching system can connect the behind-the-meter load by receiving energy data indicating an amount of available energy at the respective renewable energy power plants. The data processing system can determine a renewable energy power plant transmitted the data processing system energy data that satisfies a condition. Responsive to the determination, the data processing system can adjust the switching position of the switching system to connect the behind-the-meter load to the renewable energy power plant. The renewable energy power plant can satisfy the energy requirements of the behind-the-meter load by directing energy to the behind-the-meter load through the connection. The data processing system can change the switching position of the switching system over time to connect the behind-the-meter load with different renewable energy power plants to maintain operation. Accordingly, performance of the method 300 can enable the data processing system to connect the behind-the-meter load with different renewable energy power plants over time such that the behind-the-meter load can remain operational. The method 300 may include more or fewer operations and the operations may be performed in any order.

At operation 302, the data processing system monitors a plurality of renewable energy power plants. The data processing system may monitor the renewable energy power plants by polling or communicating with controllers (e.g., renewable energy power plant (REPP) controllers) that control and/or monitor the components within the renewable energy power plants in which the controllers operate. The controllers can determine or generate energy data for ESS systems and/or RES systems of the renewable energy power plants that the controllers respectively control. The energy data can indicate an amount of energy that is currently available for transfer to a behind-the-meter load and/or that will be available for transfer to the behind-the-meter load over a defined future time period. Such energy may be an amount of curtailed energy by a RES system and/or an excess amount of stored energy in an ESS system. The available energy may be energy that is available after a renewable energy power plant satisfies the energy requirements of an energy grid and/or any other offtakers. In some embodiments, the available may be energy that is available after powering devices (e.g., heating, ventilation, or air conditioning devices) of a renewable energy power plant. The controllers can generate the energy data by monitoring sensors of the ESS systems and/or the RES systems and/or identifying data from forecasts of energy that RES systems may generate for the future time period. The energy data can additionally or instead include a value of energy for the available energy. The controllers can transmit the energy data for the respective renewable energy power plants to the data processing system. In some cases, the controllers can store the energy data in memory and only transmit the energy data to the data processing system responsive to receiving a message (e.g., a poll) from the data processing system.

In some embodiments, the data processing system can monitor the components of the different renewable energy power plants itself. For example, the data processing system can monitor the ESSs and/or RES s of the renewable energy power plants to determine or generate energy data for the respective renewable energy power plants and/or for the respective ESS and RES systems of the renewable energy power plants. The data processing system may separately receive values of energy for the renewable energy power plants, such as from a user input.

At operation 304, the data processing system determines if energy data from one or any of the renewable energy power plants satisfies a condition. The data processing system may determine a condition is satisfied for a renewable energy power plant based on the monitoring that the data processing system performs in the operation 302. For example, the data processing system may determine a condition is satisfied responsive to receiving a message from a controller of a renewable energy power plant that includes energy data indicating there is available energy at the renewable energy power plant. In another example, the data processing system may determine a condition is satisfied for a renewable energy power plant responsive to determining the renewable energy power plant has the highest amount of available energy of the monitored renewable energy power plants. The data processing system may determine energy data from a renewable energy power plant satisfies any condition. The data processing system may repeat the operations 302 and 304 until determining a condition is satisfied for a renewable energy power plant.

At operation 306, the data processing system selects a switching position for the switching system. The data processing system can select the switching position for the switching system based on the renewable energy power plant that provided the energy data that satisfied the condition. For example, the data processing system can determine energy data from a first renewable energy power plant satisfies a condition. The data processing system can identify a first switching position (e.g., a first configuration) for the switching system that corresponds to the first renewable energy power plant from memory. The first switching position can connect or operationally couple (e.g., via a physical switch or a power flow device) the behind-the-meter load with the first renewable energy power plant such that the first renewable energy power plant can provide energy to the behind-the-meter load. The connection or coupling can do so, for example, by connecting or coupling the behind-the-meter load with a bus (e.g., an electrical bus) of the first renewable energy power plant.

At operation 308, the data processing system adjusts the switching system. The data processing system can adjust the switching system according to the selected first switching position. For example, the data processing system can transmit a control signal to the switching system that causes a physical switch connecting the behind-the-meter load with the first renewable energy power plant to close and each other physical switch of the switching system to be open. In another example, the data processing system can transmit a control signal to the switching system that causes a power flow device that controls energy transfer between the behind-the-meter load and the first renewable energy power plant to be active and/or each other power flow device of the switching system to be inactive. Upon adjusting the switching system to be in the first switching position, the first renewable energy power plant can power the behind-the-meter load with available energy that the first renewable energy plant generates and/or has stored after supplying energy to the devices maintaining operation of the first renewable energy power plant and/or the energy grid and/or any other offtakers, such as to satisfy any contractual agreements with the energy grid and/or the offtakers.

At operation 310, the data processing system monitors the renewable energy power plants. At operation 312, the data processing system determines if a condition is satisfied. The data processing system can perform the operations 310 and 312 in the same or a similar manner to how the data processing system performs the operations 302 and 304. The data processing system can perform the operations 310 and 312 subsequent to performing the operations 302-308. In doing so, the data processing system can determine whether any other renewable energy power plants provide energy data that satisfies a condition and/or any other renewable energy power satisfy a condition in cases in which the first renewable energy power plant provides energy data that does not satisfy the condition (e.g., the first renewable energy power plant provides energy data indicating that the first renewable energy power plant does not have any, or does not have enough, available energy to power the behind-the-meter load).

At the operation 314, the data processing system selects a switching position. The data processing system can select a switching position in response to determining at operation 312 that a second renewable energy power plant provided energy data that satisfies a condition. In selecting the switching position at operation 314, the data processing system can select a second switching position from memory. The second switching position may be a switching position in which the behind-the-meter load is connected or operationally coupled with the second renewable energy power plant, in some cases and not any other renewable energy power plants.

At the operation 316, the data processing system adjusts the switching position of the switching system. The data processing system can adjust the switching position of the switching system to the second switching position. The data processing system can perform the operation 316 in the same or a similar manner to how the data processing system performs the operation 308.

Figure 4:
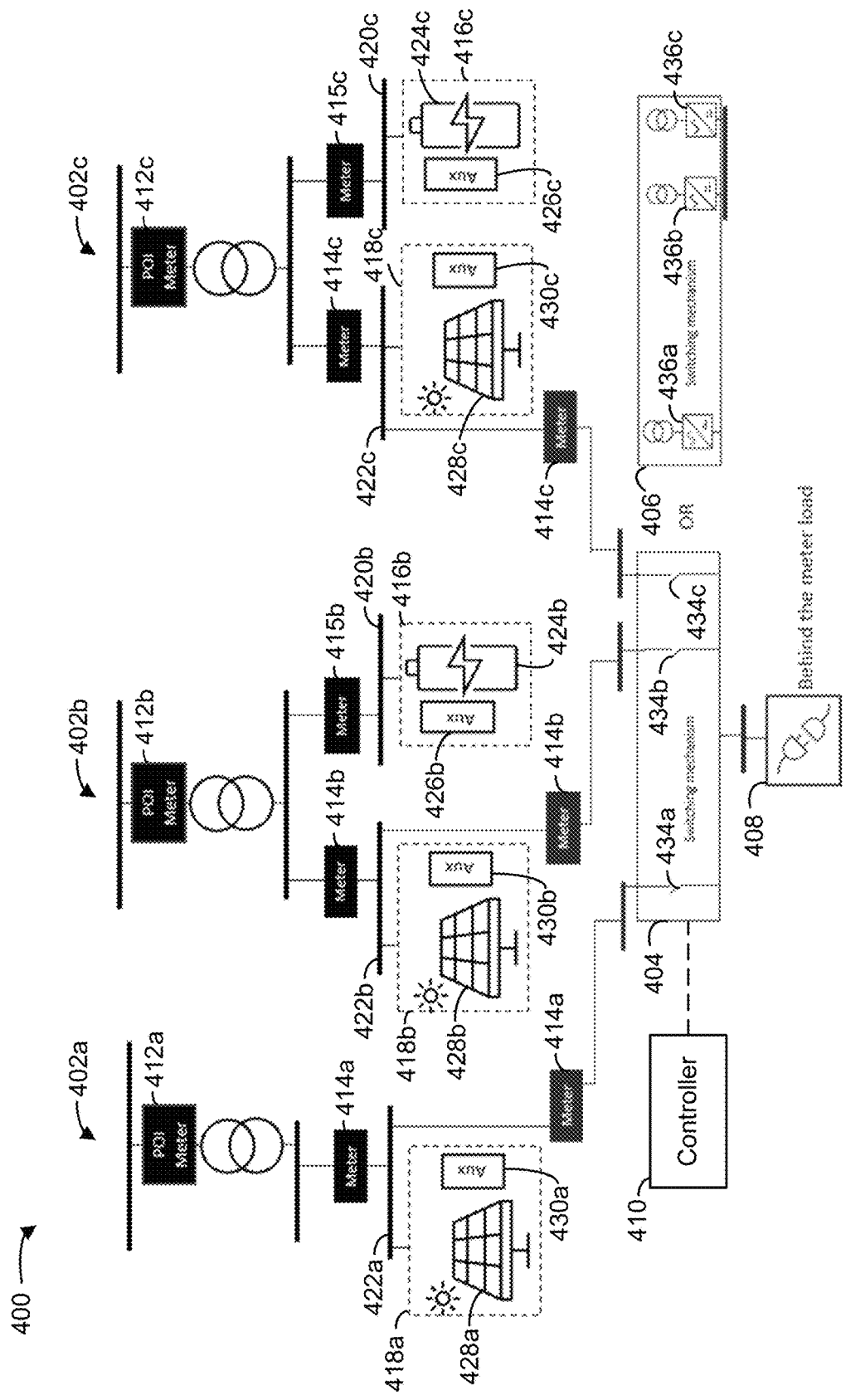
FIG. 4 illustrates an example system for transferring a behind-the-meter load between renewable energy power plants, according to some embodiments.

FIG. 4 illustrates an example system 400 for transferring a behind-the-meter load between renewable energy power plants, according to some embodiments. The system 400 may include renewable energy power plants 402a-402c (individually, renewable energy power plant 402, and collectively, renewable energy power plants 402), a first switching system 404, a second switching system 406, a behind-the-meter load 408, and/or a controller 410. The controller 410 can communicate with the switching system 404 to change the switching position of the switching system 404 to connect the behind-the-meter load 408 with the different renewable energy power plants 402 such that the connected renewable energy power plants 402 can provide energy to power the behind-the-meter load 408. The components of the system 400 can be the same as or otherwise operate similarly to the components of the system 200.

The different renewable energy power plants 402 can respectively include point of interconnection (POI) meters 412a-c (individually, POI meter 412, and collectively, POI meters 412), RES meters 414a-c (individually, RES meter 414, and collectively, RES meters 414), ESS meters 415b-c (individually, ESS meter 415, and collectively, ESS meters 415, ESS systems 416 b-c (individually, ESS system 416, and collectively, ESS systems 416), and/or RES systems 418a-c (individually, RES system 418, and collectively, RES systems 418). The renewable energy power plants 402 can connect with an energy grid (e.g., the same energy grid), such as the energy grid 214, shown and described with reference to FIG. 2, through the POI meters 412. The ESS systems 416 can be connected with the POI meters 412 through ESS buses 420b-c (individually, ESS bus 420, and collectively, ESS buses 420). The RES systems 418 can be connected with the POI meters 412 through RES buses 422a-c (individually, RES bus 422, and collectively, RES buses 422).

The ESS systems 416 can respectively include ESSs 424b-c (individually, ESS 424, and collectively, ESSs 424) and ESS devices 426b-c (individually, ESS device 426, and collectively, ESS devices 426). The ESSs 424 can connect with the respective ESS devices 426 of the same ESS systems 416 through the ESS buses 420. Accordingly, the ESSs 424 can respectively power or provide energy to the ESS devices 426 to operate.

The RES systems 418 can respectively include RESs 428a-c (individually, RES 428, and collectively, RESs 428) and RES devices 430a-c (individually, RES device 430, and collectively, RES devices 430). The RESs 428 can be or include any type of renewable energy source. The RESs 428 can connect with the respective RES devices 430 of the same RES systems 418 through the RES buses 422. Accordingly, the RESs 428 can respectively power or provide energy to the RES devices 430 to operate.

Depending on the embodiment, the system 400 can include one of the first switching system 404 or the second switching system 406. The first switching system 404 can include switches 434a-c (individually, switch 434, and collectively, switches 434). Each of the switches 434 can be configured to connect and/or disconnect the behind-the-meter load 408 with or from a different renewable energy power plant 402. The switching system 406 can include power flow devices 436a-c (individually, power flow device 436, and collectively, power flow devices 436). The power flow devices can be PCS s, for example. Each of the power flow devices 436 can be configured to activate and/or deactivate to connect and/or deactivate the behind-the-meter load 408 with a different renewable energy power plant 402. In some embodiments, the power flow devices 436 can be controlled (e.g., by the controller 410) to limit or set the amount of energy the respective renewable energy power plants 402 can direct to the behind-the-meter load 408 through the activated power flow devices 436.

The controller 410 can control the switching position of the switching system 404 or 406 (depending on the embodiment) to connect the behind-the-meter load 408 with different renewable energy power plants 402 over time. For example, as described above, the controller 410 can receive energy data from controllers (not shown) of the respective renewable energy power plants 402. The controller 410 can compare the energy data with different conditions. The controller 410 can determine energy data from a renewable energy power plant 402 satisfies a condition. Responsive to doing so, the controller 410 can adjust the switching position of the switching system 404 or 406 to connect the behind-the-meter load 408 with the renewable energy power plant 402 (e.g., a bus 420 or 422 of the renewable energy power plant 402) that transmitted the controller 410 the condition satisfying energy data. The controller 410 can later determine subsequently received energy data from a different renewable energy power plant 402 satisfies the same or a different condition. Responsive to doing so, the controller can adjust the switching position of the switching system 404 or 406 to connect the behind-the-meter load 408 with the different renewable energy power plant 402. The controller 410 can repeat this process over time to maintain operation of the behind-the-meter load 408 and reduce wasting energy generated or stored by the respective renewable energy power plants 402.

In at least one aspect, the present disclosure describes a system. The system can include a behind-the-meter load; a switching system configured to selectively couple the behind-the-meter load with one or more of a plurality of renewable energy power plants (REPPs) over time, each of the plurality of REPPs comprising a REPP controller and at least one of an energy storage system (ESS) or a renewable energy source (RES); and a controller in communication with the switching system and the REPP controller of each of the plurality of REPPs, the controller configured to: receive, from the REPP controller of each of the plurality of REPPs, energy data regarding available energy of the REPP; determine first energy data received from a first REPP controller of a first REPP of the plurality of REPPs satisfies a condition; and responsive to the determination, adjust a switching position of the switching system to a first switching position to enable the first REPP to provide energy to the behind-the-meter load.

In some embodiments, the first energy data indicates a first amount of energy generated by the RES of the first REPP that is being curtailed at the first REPP, the first amount of energy being curtailed being available energy of the first REPP. The controller can be configured to determine the first amount of energy being curtailed satisfies the condition. In some embodiments, the behind-the-meter load is selectively coupled with an energy grid with a connection outside of the switching system. The behind-the-meter load can be configured to draw energy from the energy grid when the behind-the-meter load is not receiving enough energy from the switching system to operate.

In some embodiments, the switching system comprises a plurality of switches, each of the plurality of switches configured to selectively connect the behind-the-meter load with a different REPP of the plurality of REPPs. The controller can be configured to adjust the switching position of the switching system to the first switching position to enable the first REPP to provide energy to the behind-the-meter load by causing a first switch configured to connect the first REPP with the behind-the-meter load to be closed and each other switch of the plurality of switches to be open. In some embodiments, the switching system comprises a plurality of power flow devices, each of the plurality of power flow devices configured to selectively activate to couple the behind-the-meter load with a different REPP of the plurality of REPPs. The controller can be configured to adjust the switching position of the switching system to enable the first REPP to provide energy to the behind-the-meter load by causing a first power flow device to be activated to connect the behind-the-meter load with the first REPP and each other power flow device of the plurality of power flow devices to be inactivated. In some embodiments, the first power flow device is a PCS.

In some embodiments, the controller is configured to compare the energy data received from each of the plurality of REPPS; and determine the first energy data received from the first REPP controller of the first REPP satisfies a condition based on the comparison. In some embodiments, the controller is configured to identify energy requirements of the behind-the-meter load; assign allocations of energy to two or more of the plurality of REPPs based on the energy data received from the REPP controllers of each of the two or more REPPs; and adjust the switching position of the switching system to enable the two or more REPPs to provide energy to the behind-the-meter load according to the assigned allocations. In some embodiments, the switching system comprises a plurality of power flow devices, each of the plurality of power flow devices configured to selectively activate to couple the behind-the-meter load with a different REPP of the plurality of REPPs. The controller can be configured to adjust the switching position of the switching system to enable the two or more REPPs to provide energy to the behind-the-meter load according to the assigned allocations by causing two or more power flow devices connected between the two or more REPPs and the behind-the-meter load to be activated to connect the behind-the-meter load with the two or more REPPs and each other power flow device of the plurality of power flow devices to be inactivated.

In some embodiments, the controller is configured to activate the two or more power flow devices by transmitting one or more control signals to the two or more power flow devices that cause the two or more power flow devices to draw amounts of energy corresponding to (e.g., equal to) allocations that respectively correspond to the two or more renewable energy power plants. In some embodiments, the controller is configured to assign allocations of energy to the two or more of the plurality of REPPs by identifying an amount of available energy for each of the plurality of REPPs from the energy data received from each of the plurality of REPP controllers; selecting the two or more REPPs responsive to determining the amount of available energy for the two or more REPPS satisfies energy requirements of the behind-the-meter load; and assign the allocations of energy to the two or more REPPS such that the allocations satisfy the energy requirements of the behind-the-meter load.

In some embodiments, the controller is configured to identify a value of energy in the energy data received from each of the plurality of REPPs; compare the values of energy between energy data received from the plurality of REPPs; determine first energy data received from a first REPP controller of a first REPP of the plurality of REPPs satisfies the condition responsive to determining a first value of energy of the first energy data is the lowest of the values of energy. In some embodiments, the controller is configured to receive, from the REPP controller of each of the plurality of REPPs subsequent to adjusting the switching position of the switching system to the first position, subsequent energy data regarding available energy of the REPP; determine second energy data received from a second REPP controller of a second REPP of the plurality of REPPs satisfies the condition or a second condition; and responsive to the determination, adjust the switching position of the switching system from the first switching position to a second switching position to enable the second REPP to provide energy to the behind-the-meter load. In some embodiments, the controller is configured to adjust the switching position of the switching system from the first switching position to the second switching position by disabling the first REPP from providing energy to the behind-the-meter load.

In at least one aspect, the present disclosure describes a method. The method can include receiving, by a controller from a renewable energy power plant (REPP) controller of each of a plurality of REPPs, energy data regarding available energy of an REPP controlled by the REPP controller, each of the plurality of REPPs comprising a REPP controller and at least one of an energy storage system (ESS) or a renewable energy source (RES); determining, by the controller, first energy data received from a first REPP controller of a first REPP of the plurality of REPPs satisfies a condition; and responsive to the determining, adjusting, by the controller, a switching position of a switching system to a first switching position to enable the first REPP to provide energy to a behind-the-meter load, the switching system configured to selectively couple the behind-the-meter load with one or more of a plurality of renewable energy power plants (REPPs) over time.

In some embodiments, the first energy data indicates a first amount of energy generated by the RES of the first REPP that is being curtailed at the first REPP, the first amount of energy being curtailed being available energy of the first REPP. Determining the first energy data satisfies the condition can include determining, by the controller, the first amount energy being curtailed satisfies the condition. In some embodiments, the method includes identifying, by the controller, energy requirements of the behind-the-meter load; assigning, by the controller, allocations of energy to two or more of the plurality of REPPs based on the energy data received from the REPP controllers of each of the two or more REPPs; and adjusting, by the controller, the switching position of the switching system to enable the two or more REPPs to provide energy to the behind-the-meter load according to the assigned allocations.

In at least one aspect, the present disclosure describes a non-transitory computer-readable medium comprising computer-executable instructions embodied thereon that, when executed by a processor, cause the processor to perform a method comprising receiving, from a renewable energy power plant (REPP) controller of each of a plurality of REPPs, energy data regarding available energy of an REPP controlled by the REPP controller, each of the plurality of REPPs comprising a REPP controller and at least one of an energy storage system (ESS) or a renewable energy source (RES); determining first energy data received from a first REPP controller of a first REPP of the plurality of REPPs satisfies a condition; and responsive to the determining, adjusting a switching position of a switching system to a first switching position to enable the first REPP to provide energy to a behind-the-meter load, the switching system configured to selectively couple the behind-the-meter load with one or more of a plurality of renewable energy power plants (REPPs) over time.

In some embodiments, the first energy data indicates a first amount of energy generated by the RES of the first REPP that is being curtailed at the first REPP, the first amount of energy being curtailed being available energy of the first REPP. Determining the first energy data satisfies the condition can include determining, by the controller, the first amount energy being curtailed satisfies the condition. In some embodiments, the method comprises identifying energy requirements of the behind-the-meter load; assigning allocations of energy to two or more of the plurality of REPPs based on the energy data received from the REPP controllers of each of the two or more REPPs; and adjusting the switching position of the switching system to enable the two or more REPPs to provide energy to the behind-the-meter load according to the assigned allocations.

Computing Environment

Having discussed specific embodiments of the present solution, it may be helpful to describe aspects of the operating environment as well as associated system components (e.g., hardware elements) in connection with the methods and systems described herein.

Figure 5A:
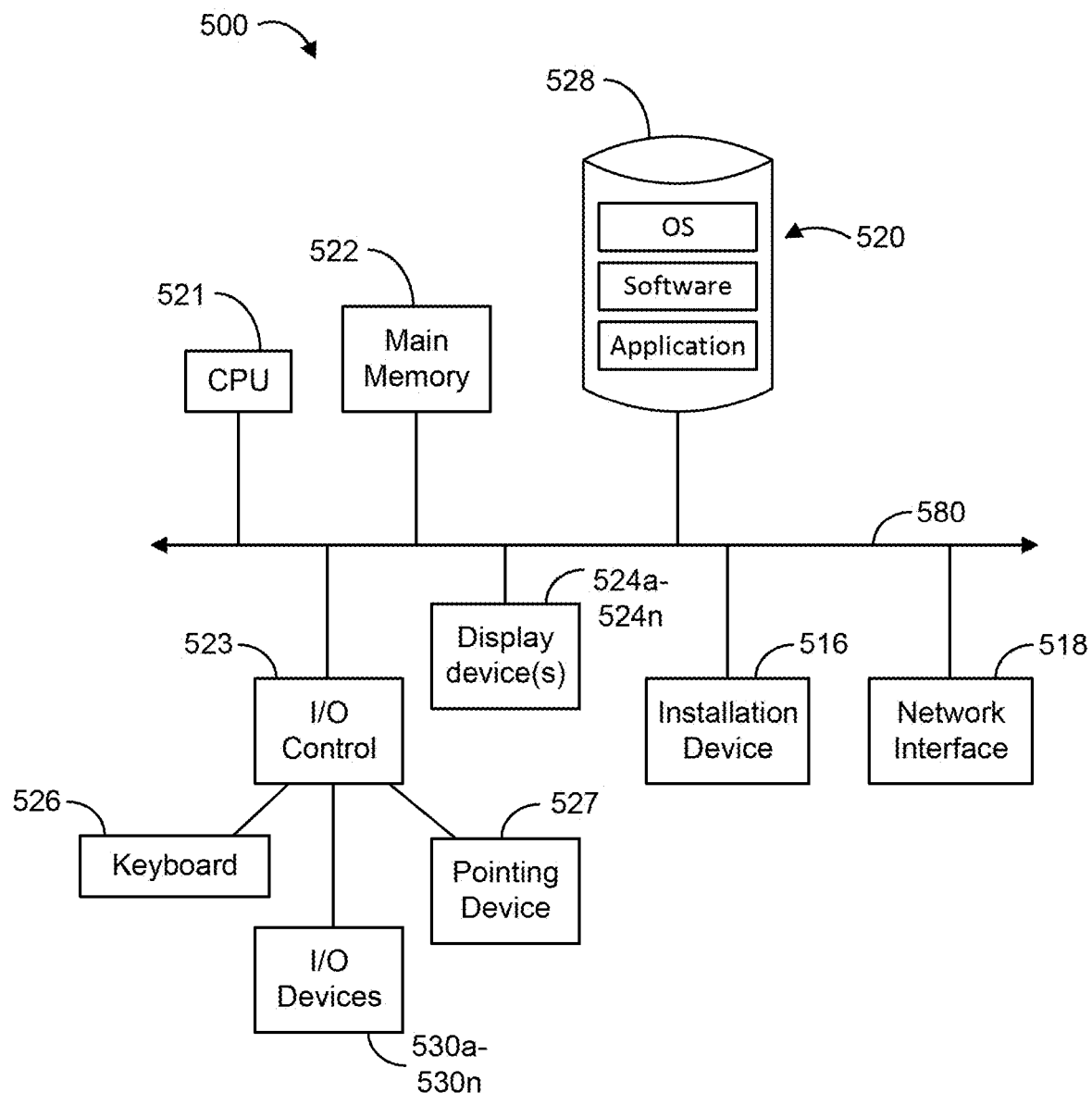
FIGS. 5A and 5B are block diagrams depicting embodiments of computing devices useful in connection with the methods and systems described herein.
Figure 5B:
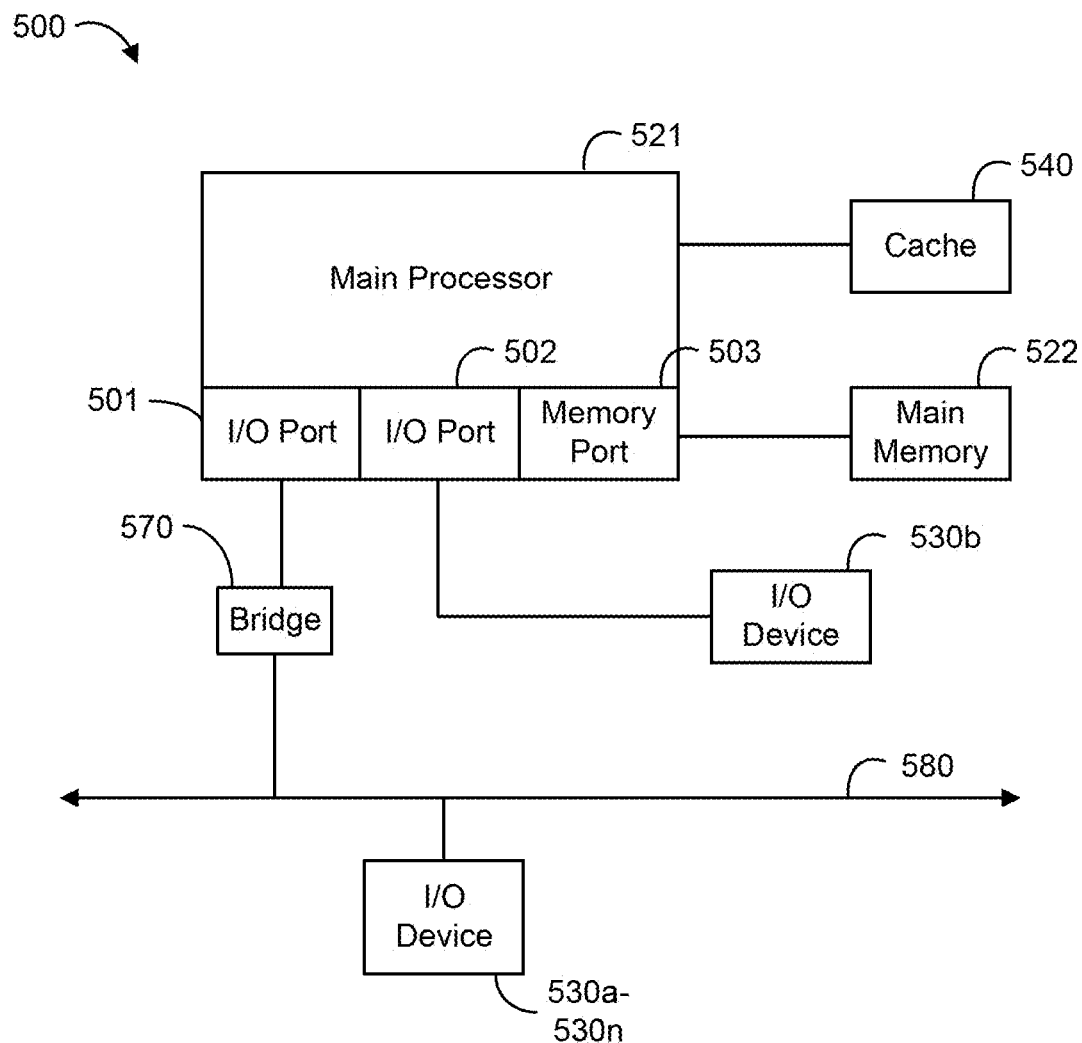

The systems discussed herein may be deployed as and/or executed on any type and form of computing device, such as a computer, network device or appliance capable of communicating on any type and form of network and performing the operations described herein. FIGS. 5A and 5B depict block diagrams of a computing device 500 useful for practicing an embodiment of the systems and methods described herein. The computing device 500 may be, for example, one or more of the switch controller 202 and/or the controllers 206, shown and described with reference to FIG. 2. As shown in FIGS. 5A and 5B, each computing device 500 includes a central processing unit 521, and a main memory unit 522. As shown in FIG. 5A, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5B, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 500 may be based on any of these processors, or any other processor capable of operating as described herein.

The main memory unit 522 may be one or more memory chips capable of storing data and allowing any storage location to be directly accessed by the central processing unit 521, such as any type or variant of Static random access memory (SRAM), Dynamic random access memory (DRAM), Ferroelectric RAM (FRAM), NAND Flash, NOR Flash and Solid State Drives (SSD). The main memory unit 522 may be based on any of the above described memory chips, or any other available memory chips capable of operating as described herein. In the embodiment shown in FIG. 5A, the central processing unit 521 communicates with main memory unit 522 via a system bus 580 (described in more detail below). FIG. 5B depicts an embodiment of a computing device 500 in which the processor communicates directly with the main memory unit 522 via a memory port 503. For example, in FIG. 5B the main memory unit 522 may be DRDRAM.

FIG. 5B depicts an embodiment in which the central processing unit 521 communicates directly with cache memory 540 via a secondary bus, sometimes referred to as a backside bus. In other embodiments, the central processing unit 521 communicates with cache memory 540 using the system bus 580. Cache memory 540 typically has a faster response time than main memory unit 522 and is provided by, for example, SRAM, BSRAM, or EDRAM. In the embodiment shown in FIG. 5B, the central processing unit 521 communicates with various I/O devices 530 via a local system bus 580 through an I/O port 501 and/or an I/O port 502. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the central processing unit 521 may use an Advanced Graphics Port (AGP) to communicate with the display 524. FIG. 5B depicts an embodiment of a computer 500 in which the central processing unit 521 may communicate directly with I/O device 530b, for example via HYPERTRANSPORT, RAPIDIO, or INFINIBAND communications technology. FIG. 5B also depicts an embodiment in which local buses and direct communication are mixed: the central processing unit 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 523 as shown in FIG. 5A. The I/O controller may control one or more I/O devices such as a keyboard 526 and a pointing device 527, e.g., a mouse or optical pen. Furthermore, an I/O device may also provide storage and/or an installation device 516 for the computing device 500. In still other embodiments, the computing device 500 may provide USB connections (not shown) to receive handheld USB storage devices such as the USB Flash Drive line of devices manufactured by Twintech Industry, Inc., of Los Alamitos, California.

Referring again to FIG. 5A, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 203 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some implementations, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some implementations, any portion of the operating system of the computing device 500 may be configured for using multiple displays 524a-524n. One ordinarily skilled in the art will recognize and appreciate the various ways and embodiments that a computing device 500 may be configured to have one or more display devices 524a-524n.

In further embodiments, an I/O device 530 may be a bridge between the system bus 580 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5A and 5B may operate under the control of an operating system, which control scheduling of tasks and access to system resources. The computing device 500 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some implementations, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Any references to ranges or values can be references to approximations of the same ranges or values. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
a behind-the-meter load;
a switching system configured to selectively couple the behind-the-meter load with one or more of a plurality of renewable energy power plants (REPPs) over time, each of the plurality of REPPs comprising a REPP controller and at least one of an energy storage system (ESS) or a renewable energy source (RES); and a controller in communication with the switching system and the REPP controller of each of the plurality of REPPs, the controller configured to:
- receive, from the REPP controller of each of the plurality of REPPs, energy data regarding available energy of the REPP;
- determine first energy data received from a first REPP controller of a first REPP of the plurality of REPPs satisfies a condition; and
- responsive to the determination, adjust a switching position of the switching system to a first switching position to enable the first REPP to provide energy to the behind-the-meter load.

2. The system of claim 1, wherein the first energy data indicates a first amount of energy generated by the RES of the first REPP that is being curtailed at the first REPP, the first amount of energy being curtailed being available energy of the first REPP; and
wherein the controller is configured to determine the first amount of energy being curtailed satisfies the condition.

3. The system of claim 1, wherein the behind-the-meter load is selectively coupled with an energy grid with a connection outside of the switching system; and
wherein the behind-the-meter load is configured to draw energy from the energy grid when the behind-the-meter load is not receiving enough energy from the switching system to operate.

4. The system of claim 1, wherein the switching system comprises a plurality of switches, each of the plurality of switches configured to selectively connect the behind-the-meter load with a different REPP of the plurality of REPPs, and
wherein the controller is configured to adjust the switching position of the switching system to the first switching position to enable the first REPP to provide energy to the behind-the-meter load by causing a first switch configured to connect the first REPP with the behind-the-meter load to be closed and each other switch of the plurality of switches to be open.

5. The system of claim 1, wherein the switching system comprises a plurality of power flow devices, each of the plurality of power flow devices configured to selectively activate to couple the behind-the-meter load with a different REPP of the plurality of REPPs, and
wherein the controller is configured to adjust the switching position of the switching system to enable the first REPP to provide energy to the behind-the-meter load by causing a first power flow device to be activated to connect the behind-the-meter load with the first REPP and each other power flow device of the plurality of power flow devices to be inactivated.

6. The system of claim 5, wherein the first power flow device is a power conversion system (PCS).

7. The system of claim 1, wherein the controller is configured to:
- compare the energy data received from each of the plurality of REPPS; and
- determine the first energy data received from the first REPP controller of the first REPP satisfies a condition based on the comparison.

8. The system of claim 1, wherein the controller is configured to:
- identify energy requirements of the behind-the-meter load;
- assign allocations of energy to two or more of the plurality of REPPs based on the energy data received from the REPP controllers of each of the two or more REPPs; and
- adjust the switching position of the switching system to enable the two or more REPPs to provide energy to the behind-the-meter load according to the assigned allocations.

9. The system of claim 8, wherein the switching system comprises a plurality of power flow devices, each of the plurality of power flow devices configured to selectively activate to couple the behind-the-meter load with a different REPP of the plurality of REPPs,
wherein the controller is configured to adjust the switching position of the switching system to enable the two or more REPPs to provide energy to the behind-the-meter load according to the assigned allocations by causing two or more power flow devices connected between the two or more REPPs and the behind-the-meter load to be activated to connect the behind-the-meter load with the two or more REPPs and each other power flow device of the plurality of power flow devices to be inactivated.

10. The system of claim 9, wherein the controller is configured to activate the two or more power flow devices by transmitting one or more control signals to the two or more power flow devices that cause the two or more power flow devices to draw amounts of energy corresponding to allocations that respectively correspond to the two or more renewable energy power plants.

11. The system of claim 8, wherein the controller is configured to assign allocations of energy to the two or more of the plurality of REPPs by:
- identifying an amount of available energy for each of the plurality of REPPs from the energy data received from each of the plurality of REPP controllers;
- selecting the two or more REPPs responsive to determining the amount of available energy for the two or more REPPS satisfies energy requirements of the behind-the-meter load; and
- assign the allocations of energy to the two or more REPPS such that the allocations satisfy the energy requirements of the behind-the-meter load.

12. The system of claim 1, wherein the controller is configured to:
- identify a value of energy in the energy data received from each of the plurality of REPPs;
- compare the values of energy between energy data received from the plurality of REPPs;
- determine first energy data received from a first REPP controller of a first REPP of the plurality of REPPs satisfies the condition responsive to determining a first value of energy of the first energy data is the lowest of the values of energy.

13. The system of claim 1, wherein the controller is configured to:
- receive, from the REPP controller of each of the plurality of REPPs subsequent to adjusting the switching position of the switching system to the first position, subsequent energy data regarding available energy of the REPP;
- determine second energy data received from a second REPP controller of a second REPP of the plurality of REPPs satisfies the condition or a second condition; and
- responsive to the determination, adjust the switching position of the switching system from the first switching position to a second switching position to enable the second REPP to provide energy to the behind-the-meter load.

14. The system of claim 13, wherein the controller is configured to adjust the switching position of the switching system from the first switching position to the second switching position by disabling the first REPP from providing energy to the behind-the-meter load.

15. A method, comprising:
receiving, by a controller from a renewable energy power plant (REPP) controller of each of a plurality of REPPs, energy data regarding available energy of an REPP controlled by the REPP controller, each of the plurality of REPPs comprising a REPP controller and at least one of an energy storage system (ESS) or a renewable energy source (RES);
determining, by the controller, first energy data received from a first REPP controller of a first REPP of the plurality of REPPs satisfies a condition; and
responsive to the determining, adjusting, by the controller, a switching position of a switching system to a first switching position to enable the first REPP to provide energy to a behind-the-meter load, the switching system configured to selectively couple the behind-the-meter load with one or more of a plurality of renewable energy power plants (REPPs) over time.

16. The method of claim 15, wherein the first energy data indicates a first amount of energy generated by the RES of the first REPP that is being curtailed at the first REPP, the first amount of energy being curtailed being available energy of the first REPP; and
wherein determining the first energy data satisfies the condition comprises determining, by the controller, the first amount energy being curtailed satisfies the condition.

17. The method of claim 15, comprising:
identifying, by the controller, energy requirements of the behind-the-meter load;
assigning, by the controller, allocations of energy to two or more of the plurality of REPPs based on the energy data received from the REPP controllers of each of the two or more REPPs; and
adjusting, by the controller, the switching position of the switching system to enable the two or more REPPs to provide energy to the behind-the-meter load according to the assigned allocations.

18. A non-transitory computer-readable medium comprising computer-executable instructions embodied thereon that, when executed by a processor, cause the processor to perform a method comprising:
receiving, from a renewable energy power plant (REPP) controller of each of a plurality of REPPs, energy data regarding available energy of an REPP controlled by the REPP controller, each of the plurality of REPPs comprising a REPP controller and at least one of an energy storage system (ESS) or a renewable energy source (RES);
determining first energy data received from a first REPP controller of a first REPP of the plurality of REPPs satisfies a condition; and
responsive to the determining, adjusting a switching position of a switching system to a first switching position to enable the first REPP to provide energy to a behind-the-meter load, the switching system configured to selectively couple the behind-the-meter load with one or more of a plurality of renewable energy power plants (REPPs) over time.

19. The non-transitory computer-readable medium of claim 18, wherein
the first energy data indicates a first amount of energy generated by the RES of the first REPP that is being curtailed at the first REPP, the first amount of energy being curtailed being available energy of the first REPP; and
wherein determining the first energy data satisfies the condition comprises determining, by the controller, the first amount of energy being curtailed satisfies the condition.

20. The non-transitory computer-readable medium of claim 18, wherein the method comprises:
identifying energy requirements of the behind-the-meter load;
assigning allocations of energy to two or more of the plurality of REPPs based on the energy data received from the REPP controllers of each of the two or more REPPs; and
adjusting the switching position of the switching system to enable the two or more REPPs to provide energy to the behind-the-meter load according to the assigned allocations.

* * * * *